(12) United States Patent
Nakajima

(10) Patent No.: US 7,471,306 B2
(45) Date of Patent: Dec. 30, 2008

(54) OPTICAL SCANNING UNIT AND IMAGE FORMING APPARATUS

(75) Inventor: Tomohiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 169 days.

(21) Appl. No.: 11/195,805

(22) Filed: Aug. 3, 2005

(65) Prior Publication Data

US 2006/0028533 A1  Feb. 9, 2006

(30) Foreign Application Priority Data

Aug. 6, 2004  (JP) .............................. 2004-231111
Dec. 15, 2004  (JP) .............................. 2004-363438

(51) Int. Cl.
*G02B 26/10* (2006.01)
*B41J 2/447* (2006.01)

(52) U.S. Cl. .................................... 347/233

(58) Field of Classification Search .......... 347/233–245
See application file for complete search history.

(56) References Cited

U.S. PATENT DOCUMENTS

| 5,392,151 | A | * | 2/1995 | Nelson .................... 359/223 |
| 5,999,345 | A | | 12/1999 | Nakajima et al. |
| 6,657,765 | B2 | | 12/2003 | Hayashi et al. |
| 7,133,061 | B2 | * | 11/2006 | Dewa et al. ................. 347/243 |
| 2002/0171878 | A1 | | 11/2002 | Nakajima |
| 2003/0072066 | A1 | | 4/2003 | Hayashi et al. |
| 2003/0202231 | A1 | * | 10/2003 | Nakatsu ..................... 359/216 |
| 2004/0032631 | A1 | | 2/2004 | Amada et al. |
| 2004/0051033 | A1 | * | 3/2004 | Hagen et al. ................ 250/234 |
| 2005/0030606 | A1 | | 2/2005 | Nakajima |
| 2006/0028533 | A1 | | 2/2006 | Nakajima |

FOREIGN PATENT DOCUMENTS

| JP | 05257075 A | * | 10/1993 |
| JP | 2924200 | | 5/1999 |
| JP | 3011144 | | 12/1999 |
| JP | 2002-258183 | | 9/2002 |
| JP | 2002-277808 | | 9/2002 |
| JP | 2002-296534 | | 10/2002 |
| JP | 2002-318359 | | 10/2002 |
| JP | 2002-318363 | | 10/2002 |
| JP | 2003-98459 | | 4/2003 |
| JP | 2003-131154 | | 5/2003 |

(Continued)

OTHER PUBLICATIONS

U.S. Appl. No. 11/765,166, filed Jun. 19, 2007, Nakajima.

(Continued)

*Primary Examiner*—Huan H Tran
(74) *Attorney, Agent, or Firm*—Oblon, Spivak, McClelland, Maier & Neustadt, P.C.

(57) ABSTRACT

An optical scanning unit, includes a light source having a plurality of light emitting sources, a vibration mirror part configured to reciprocatingly scan a light beam emitted from the light source where a torsion bar is a rotational axis, and a recording control part configured to output image information for modulating the light emitting source as corresponding to a scan operation of the vibrating mirror part. Image information corresponding to one line to be recorded is shared by the light sources so that image recording is implemented.

7 Claims, 22 Drawing Sheets

| | FOREIGN PATENT DOCUMENTS | | | JP | 2005-37557 | 2/2005 |
|----|----|----|----|----|----|----|
| JP | 3445691 | 6/2003 | | | | |

OTHER PUBLICATIONS

| JP | 2003-337293 | 11/2003 |
|----|----|----|
| JP | 3526400 | 2/2004 |
| JP | 2004-184527 | 7/2004 |
| JP | 2004-184843 | 7/2004 |
| JP | 2005-24722 | 1/2005 |

U.S. Appl. No. 11/609,098, filed Dec. 11, 2006, Nakajima.
U.S. Appl. No. 12/028,446, filed Feb. 8, 2008, Nakamura, et al.
U.S. Appl. No. 12/051,404, filed Mar. 19, 2008, Amada, et al.

* cited by examiner

OPTICAL SCANNING UNIT AND IMAGE FORMING APPARATUS

BACKGROUND OF THE INVENTION

1. Field of the Invention

The present invention relates to an image forming apparatus such as digital copier, printer, facsimile, or plotter, and an optical scanning unit used for such an image forming apparatus. The present invention can be also applied to an optical scanning type barcode reading apparatus, a laser radar for a vehicle, or the like.

2. Description of the Related Art

In conventional optical scanning units, polygon mirrors or galvanometer mirrors are used to deflect beams for writing images. In order to achieve high-resolution high-speed printing operations, the rotational speed of these mirrors has to be increased. However, there is a ceiling to increasing the rotational speed of the mirror because of various reasons, such as limitation in durability of the bearings, heat generation due to air resistance, and noise.

On the other hand, optical deflectors making use of micro-machining of silicon have been researched and studied. For example, Japanese Patent Nos. 2924200 and 3011144, respectively, disclose a technique for monolithically and integrally fabricating a vibrating mirror (movable mirror), together with a torsion bar supporting the mirror on its axis, from a silicon substrate. More specifically, Japanese Patent No. 3011144 discloses an example where the vibrating mirror is used instead of the polygon mirror.

In this type, namely the integrally fabricated vibrating mirror with the torsion bar, the size of the mirror surface is small. Hence, one of the advantages of this type is that the reciprocating motion of the mirror is produced by resonance, and that high-speed operation is achieved. In addition, noise and power consumption are reduced because less driving force is required to swing the vibrating mirror.

However, in order to increase the driving frequency in the vibrating mirror, namely to make speed higher, it is necessary to make the torsion bar thick or thin so that the resonance frequency is increased. Therefore, it may not be possible to maintain the sweep angle.

Because of this, in the example using the vibrating mirror, unlike the example using the conventional polygon mirror, it is not possible to scan a wide area. Hence, as disclosed in Japan Laid-Open Patent Application Publication No. 2002-258183, a method wherein plural optical scanning units are arranged where respective main scanning directions are consistent with each other and an image area is divided in the main scanning direction so that image recording is implemented, is utilized.

On the other hand, as a method making speed high without increasing the driving frequency, the image may be recorded in two directions by reciprocating scanning. However, in this case, a scanning starting side is switched between forward scanning and backward scanning and therefore scanning is implemented in zigzags. Hence, the pitch of the scanning line is not constant and this causes unevenness of light and shade. Because of this, image quality is degraded. Hence, an inefficient way for implementing the image recording by using only scanning in a single direction of the reciprocating scanning is utilized.

In Japan Laid-Open Patent Application Publication No. 2002-296534, an example where an irradiation position is moved in a sub-scanning direction as corresponding to the main scanning direction so that the pitch is made constant by correcting the inclination of the scanning line even if the scanned surface is moved, is disclosed.

As described above, in the related art, in a case where the vibrating mirror is used, since image recording is implemented by scanning in a single direction of the reciprocating scanning, there is a trade off between securing a designated sweep angle and the resonance frequency, and there is a limitation to making the speed high.

In addition, in the optical scanning unit using the polygon mirror, it may be possible to make the speed high by increasing the number n of the light emitting sources and scanning in a lump. However, as shown in FIG. 1, even if the light beams from plural light emitting sources are simultaneously scanned in the reciprocating scanning, the period of the zigzags is increased as the number of the light emitting sources is increased. Hence, a dot cannot be formed in a position along a line to be recorded in the backward scanning and therefore unevenness of the light and shade is increased. Therefore, it is not possible to both increase the number n of the light emitting sources and the reciprocating scanning. Hence, there is no method, other than increasing the driving frequency, to be applied to high-speed scanning.

SUMMARY OF THE INVENTION

Accordingly, it is a general object of the present invention to provide a novel and useful optical scanning unit and image forming apparatus.

Another and more specific object of the present invention is to provide an optical scanning unit and an image forming apparatus having the optical scanning unit, whereby image recording can be implemented without degrading the image quality due to zigzag scanning even if the scanning starting side is switched between forward scanning and backward scanning and without using a specific mechanism, and whereby high image quality is maintained even if the number n of the light emitting sources is increased, and therefore it is possible to correspond to high speed scanning.

For example, the high speed scanning can be implemented by using only ½n of the driving frequency for the vibrating mirror and controlling the modulation frequency of the light source to be low.

In addition, it is an object of the inventions to prevent unevenness of the light and shade in the zigzag scanning so that it is possible to implement the simultaneous scanning of plural lines by plural light emitting sources and to obtain image quality the same as the image quality obtained by scanning in a single direction, by image recording with reciprocating scanning. It is an object of the inventions to make operating characteristics of the vibrating mirror stable even if the environment changes and to maintain the image quality. It is an object of the inventions to provide image forming apparatuses with low noise and capable of energy saving by using the vibrating mirror.

The above object of the present invention is to provide an optical scanning unit, including:

a light source having a plurality of light emitting sources, a vibration mirror part configured to reciprocatingly scan a light beam emitted from the light source where a torsion bar is a rotational axis, and a recording control part configured to output image information for modulating the light emitting source as corresponding to a scan operation of the vibrating mirror part, wherein image information corresponding to one line to be recorded is shared by the light sources so that image recording is implemented.

According to the above-mentioned invention, high quality image forming without unevenness of the light and shade can be obtained even if plural beams are simultaneously used and image recording is done by reciprocating scanning.

The above-mentioned object of the present invention is also achieved by an optical scanning unit, including:

a light source having a plurality of light emitting sources, a vibration mirror part configured to reciprocatingly scan a light beam emitted from the light source where a torsion bar is a rotational axis, and a recording control part configured to output image information for modulating the light emitting source as corresponding to a scan operation of the vibrating mirror part, wherein image information of a plurality of lines to be recorded is mixed in image information corresponding to a single scanning of the light beam from the light emitting source.

According to the above-mentioned invention, a high quality image forming without unevenness of the light and shade can be obtained even if plural beams are simultaneously used and image recording is done by reciprocating scanning.

A sub-scanning pitch d on a scanned surface scanned by the light emitting source and a driving frequency f of the vibrating mirror part may be defined by the following formulas, namely $$d = 2p$$

$$f = v/2n \times p$$

wherein the number of the light emitting sources is n, a moving speed at a scanned surface and a scanning position is v, and a line gap to be recorded is p.

According to the above-mentioned invention, it is possible to efficiently form an image at the line pitch to be recorded, make the driving frequency of the vibrating mirror part low, and secure the desired sweep angle even if the speed is made high.

The driving frequency may be set to a frequency band that is in the vicinity of but separated from a resonance point of the vibrating mirror part.

According to the above-mentioned invention, regardless of the frequency characteristics drastically changing in the vicinity of the resonance point, even if the resonance point is changed due to the temperature change, it is possible to control the change of the sweep angle low to be so that the amplitude can be controlled to be constant by a gain adjustment. Hence, it is possible to form a high quality image wherein the unevenness of the light and shade may not be conspicuous.

Image recording may be implemented by mixing the image information corresponding to the one line and forward and backward scans of the vibrating mirror part.

According to the above-mentioned invention, the line is not divided into parts and the connected line can be formed even if the configuration of the line is wave-shaped. Hence, it is possible to form a high quality image wherein the unevenness of the light and shade may not be conspicuous.

The one line may be divided into n areas, and the image information may be formed so that main scanning directions of neighboring areas are different.

According to the above-mentioned invention, by simply changing the pixel data corresponding to the light emitting sources based on a simple rule, it is possible to form a high quality image wherein the unevenness of the light and shade may not be conspicuous.

A sweep angle for image recording may be equal to or less than 50% of a maximum sweep angle of the vibrating mirror part.

According to the above-mentioned invention, it is possible to shift a scanning end of the frontward scanning and a scanning start end of the backward scanning to a length greater than or equal to ½ line pitch in the sub-scanning direction. Even if a dot position of the scanning end is shifted in the main scanning direction due to change of the amplitude period of the vibrating mirror part and change of the main scanning magnification, it is possible to prevent the light and shade from being changed due to the interference of dots. In addition, it is possible to securely implement the synchronization detection in both forward and backward scanning and arrange joints of respective divided pixel areas and therefore it is possible to form a high quality image wherein the unevenness of the light and shade may not be conspicuous.

The optical scanning unit may include a sweep angle detection part configured to detect a change of a maximum sweep angle (amplitude) of the vibrating mirror part, wherein the driving frequency of the vibrating mirror part may be controlled to be made constant and the maximum sweep angle is controlled to be made constant based on the detection result, at least during image recording.

According to the above-mentioned invention, it is possible to make the line pitch in the single image data uniform by using plural optical scanning parts. The width of the main scanning area is not changed and therefore respective image can be precisely overlapped and it is possible to form a high quality image wherein the unevenness of the light and shade may not be conspicuous.

Beam detection parts configured to detect the light beams scanned by the vibrating mirror part may be provided on at least two positions on a scanning line, and the maximum sweep angle (amplitude) may be calculated based on detected scanning time.

According to the above-mentioned invention, it is possible to securely follow the change of the amplitude of the vibrating mirror part. The shift of the width of the main scanning area in plural optical scanning parts can be reduced. Respective images can be precisely overlapped and it is possible to form a high quality image wherein the unevenness of the light and shade may not be conspicuous.

The above-mentioned object of the present invention is achieved by an image forming apparatus, including:

a plurality of optical scanning units;

an image carrier configured to form a latent image by the optical scanning unit;

a developing part configured to develop the latent image into a toner image; and a transfer part configured to transfer the toner image onto a recording medium;

wherein the optical scanning unit including:

a light source having a plurality of light emitting sources;

a vibration mirror part configured to reciprocatingly scan a light beam emitted from the light source where a torsion bar is a rotational axis; and a recording control part configured to output image information for modulating the light emitting source as corresponding to a scan operation of the vibrating mirror part;

wherein image information corresponding to one line to be recorded is shared by the light emitting sources; and wherein image recording is implemented by overlapping the toner image formed on the image carrier corresponding to the optical scanning unit.

According to the above-mentioned invention, it is possible to provide an image forming apparatus whereby a high speed image recording can be performed with low noise and low electric power consumption.

The above-mentioned object of the present invention is achieved by an image forming apparatus, including:

a plurality of optical scanning units;

an image carrier configured to form a latent image by the optical scanning unit;

a developing part configured to develop the latent image into a toner image; and a transfer part configured to transfer the toner image onto a recording medium;

wherein the optical scanning unit includes:

a light source having a plurality of light emitting sources;

a vibration mirror part configured to reciprocatingly scan a light beam emitted from the light source where a torsion bar is a rotational axis; and a recording control part configured to output image information for modulating the light emitting source as corresponding to a scan operation of the vibrating mirror part;

wherein image information corresponding to one line to be recorded is shared by the light sources; and wherein image recording is implemented by dividing the image carrier into a plurality of areas in a main scanning direction so that the latent images are formed and by connecting the latent images.

According to the above-mentioned invention, it is possible to provide a small-sized image forming apparatus whereby high speed image recording can be done.

Other objects, features, and advantages of the present invention will become more apparent from the following detailed description when read in conjunction with the accompanying drawings.

DETAILED DESCRIPTION OF THE PREFERED EMBODIMENTS

A description of the present invention and details of drawbacks of the related art are now given, with reference to FIG. 2 through FIG. 26, including embodiments of the present invention.

Figure 22:
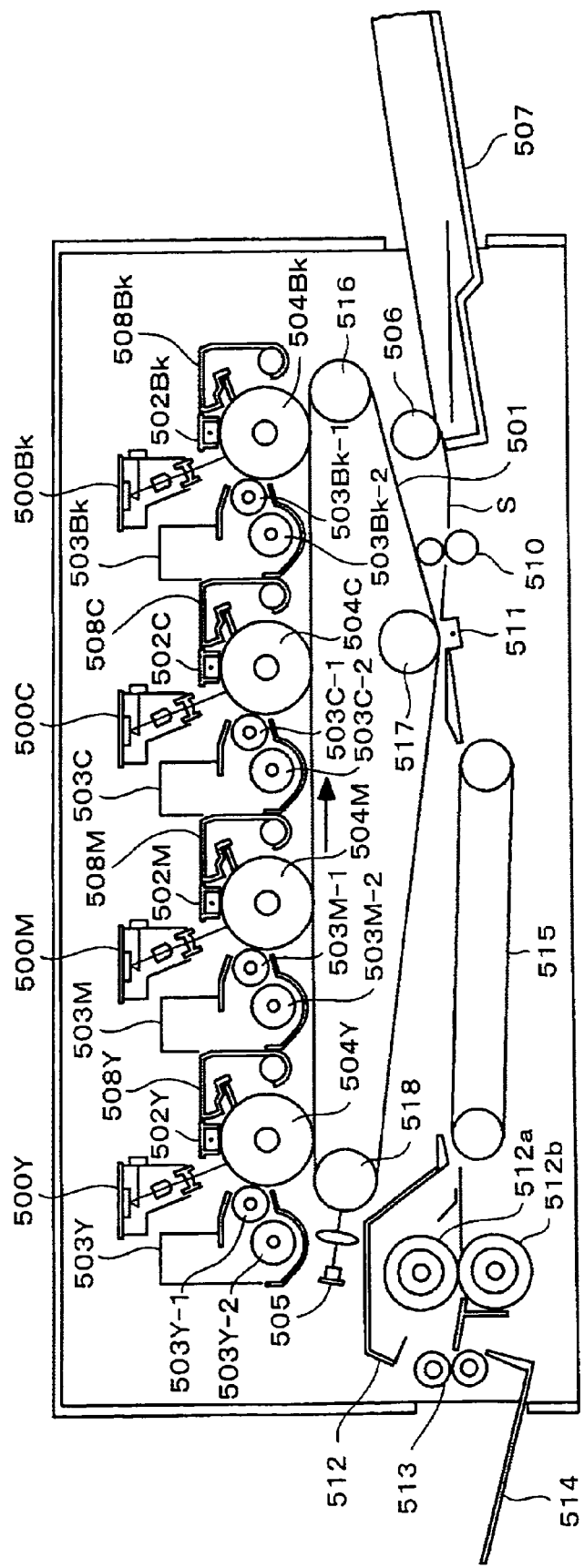
FIG. 22 is a schematic front view of a color laser printer as the image forming apparatus.

First, referring to FIG. 22, a structure of a tandem-type color laser printer as an image forming apparatus of the first embodiment of the present invention is discussed.

The color laser printer includes four photosensitive body drums 504Y, 504M, 504C and 504Bk as image carriers and an intermediate transfer belt 501. The photosensitive drums 504Y (yellow), 504M (magenta), 504C (cyan) and 504Bk (black) are arranged at a uniform interval in the moving direction of the intermediate transfer belt 501.

The intermediate transfer belt 501 is supported by three supporting rollers 516, 517 and 518 namely a single driving roller and two driven rollers. The photosensitive drums 504Y, 504M, 504C and 504Bk are arranged at uniform interval in the moving direction of the transfer belt 501 shown by an arrow.

Structure of peripheries of the photosensitive drums 504Y, 504M, 504C and 504Bk are discussed. Here, the structure of the periphery of the photosensitive drum 504Y is discussed and explanations of structures of peripheries of the other photosensitive drums 504M, 504C and 504Bk are omitted because these structures are same as the structure of the periphery of the photosensitive drum 504Y. In the periphery of the photosensitive drum 504Y, along the rotational direction (counter-clockwise direction) of the photosensitive drum 504Y, a charging apparatus 502Y, an optical scanning unit 500Y, a developing apparatus 503Y, the intermediate transfer belt 501, a cleaning apparatus 508Y, and others are arranged in this order. The charging apparatus 502Y uniformly charges the surface of the photosensitive drum 504Y. The optical scanning apparatus 500Y forms an electrostatic latent image on a surface of the charged photosensitive drum 504Y based on the image information. The developing apparatus 503Y as a developing part makes visible the electrostatic latent image as a toner image. The toner image is transferred to the intermediate transfer belt 501. The toner remaining on the photosensitive drum 504Y after the toner image is transferred to the intermediate transfer belt 501 is scraped by a blade so as to be received by the cleaning apparatus 508Y. The optical scanning apparatus 500Y is arranged so that the emission direction of a light beam is downward.

The developing apparatus 503Y includes a developing roller 503Y-1 supplying toner to the photosensitive drum 504Y, developing agent stirring member 503Y-2, and others.

Each of the electrostatic latent images corresponding to one of the four colors is formed by the associated optical scanning unit 500Y, 500M, 500C and 500Bk at a different writing start timing in the sub-scanning direction, upon a trigger of a signal supplied from a sensor 505 for detecting the registration mark formed at the end of the intermediate transfer belt 501. The latent images are developed into toner images by the developing units 503Y, 503M, 503C and 503Bk, which toner images are transferred to the intermediate transfer belt 501 and superposed on the previously transferred images.

A paper S as a recording medium is supplied from a paper feed tray 507 by a paper feed roller 506. The paper is fed by a registration roller 510 at a timing of image formation of the fourth color (Bk) image.

A four-color image is transferred from the intermediate transfer belt 501 onto the paper at a transfer unit 511.

The paper S bearing the toner image is transported by a transport belt 515 to a fixing unit 512.

The transferred toner image is fixed onto the paper by heat and pressure of a fixing roller 512a and a pressing roller 512b, and the printed paper is ejected onto a catch tray 514.

Figure 4:
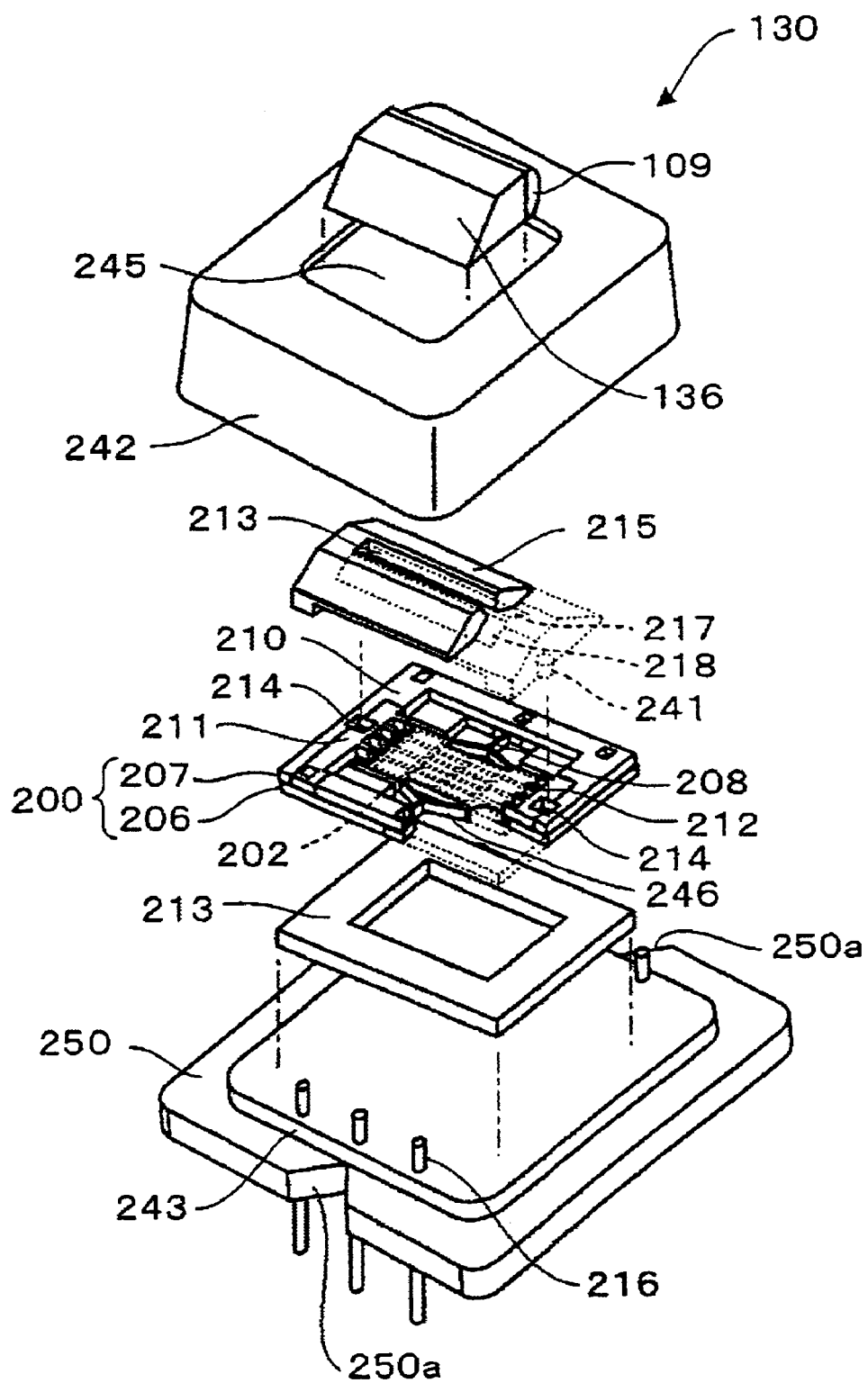
FIG. 4 is an exploded perspective view of the vibrating mirror module.

FIG. 4 is an exploded perspective view of the vibrating mirror module as means for optical scanning used in the optical scanning unit 500. In this embodiment, the first and second substrates 206 and 207 are silicon substrates, which are bonded together via an insulating layer (such as an oxide film). The first silicon substrate 206 has a thickness of 60 μm. A vibrating mirror 202 as vibrating mirror means and a pair of torsion bars 208 extending from the vibrating mirror 202 in opposite directions are formed in the first substrate 206 by etching so as to be free from a fixed frame 210.

The torsion bars 208 include elements 246 integrally formed, each torsion bar having a rotational axis 245 and angles that are formed in a Y-shaped state. Both ends of the torsion bar 208 which ends are eccentric from the rotational axis 245 are connected to the vibrating mirror 202.

In this embodiment, since a connection part between the vibrating mirror 202 and the torsion bar 208 is not provided in the center part (along the rotational axis 245) of the vibrating mirror 202, it is possible to prevent a reflection surface of the vibrating mirror 202 from being deformed due to stress transferred from the torsion bar 208, so that planarity of the connection parts can be maintained.

The vibrating mirror 202 is symmetrically formed with respect to the torsion bar 208. The edges of the fixed frame 210 that face the comb teeth of the moving mirror 202 are shaped into comb teeth so as to interleave with the comb teeth of the moving mirror 202 via gap of several μm.

Figure 5:
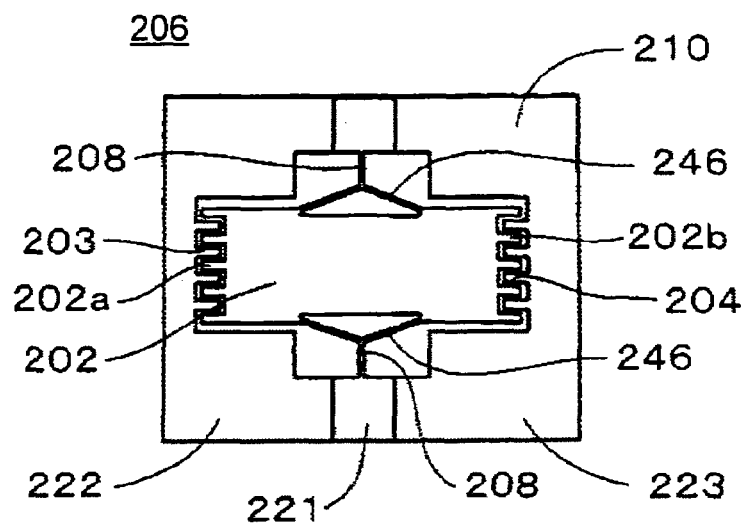
FIG. 5 is a plan view of a first substrate of a vibrating mirror substrate.
Figure 6:
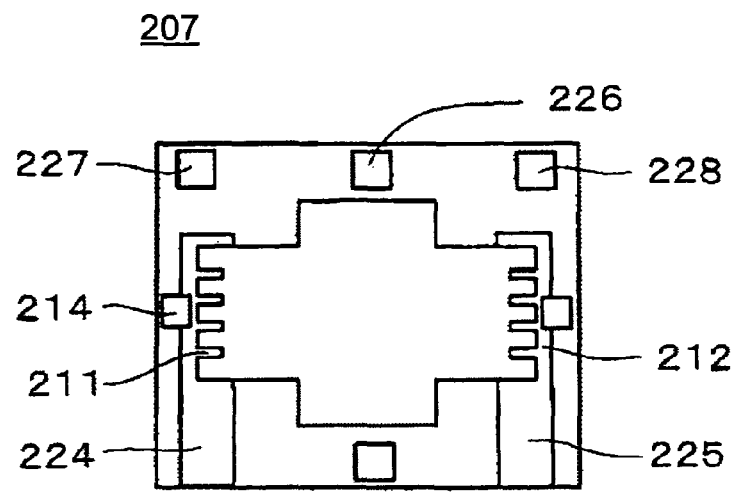
FIG. 6 is a plan view of a second substrate of a vibrating mirror substrate.

The moving mirror 202 has a metal film such as an Au film on the top surface, which functions as a reflecting surface. As shown in FIG. 5 and FIG. 6, the substrate itself is formed with electrodes by piercing a periphery of respective electrodes from the fixed frame 210 up to the insulating layer (the oxide film) as an etching stop layer and separating them individually in a state where the substrates 206 and 207 are connected via an insulating layer.

In this embodiment, the toothed edges of the fixed frame 210 become first and second fixed electrodes 203 and 204, while the toothed edges of the moving mirror 202 define first and second moving electrodes 202a and 202b. The first and second moving electrodes 202a and 202b are at the same potential during operations. The first and second fixed electrodes 203 and 204 face the first and second moving electrodes 202a and 202b, respectively. Islands 221 are also formed in the first substrate 206, to which the first portion 208a of the torsion bar 208 is connected. On both sides of the island 221 are islands 222 and 223, which are isolated from the island 221 by grooves (not shown). The islands 222 and 223 have the fixed electrodes 203 and 204, respectively. The islands 222 and 223 are also separated from the moving mirror 202 by a groove gap of about 5 μm.

The second silicon substrate 207 has a thickness of 140 μm, and has an opening in the center penetrating through the substrate 207. The opening is formed by etching so as to define a fixed frame corresponding to the fixed frame 210 of the first substrate 206. The inner edge of the frame of the second substrate 207 has comb-teeth portions, which face each other with openings between them. The tomb-teeth portions function as third and fourth fixed electrodes 211 and 212. The fixed electrodes 211 and 212 are located in islands 224 and 225, respectively, separated from the fixed frame of the second substrate 207 by a groove (not shown). The groove of the second substrate 207 is formed so as not to overlap the groove of the first substrate 206. Accordingly, the first substrate 206 and the second substrate 207 can be bonded together even if several islands are isolated by grooves penetrating the substrates.

The moving electrodes formed in each of the end portions of the moving mirror 202 pass between comb teeth of one of the third and fourth fixed electrodes 211 and 212 during the oscillation of the moving mirror 202.

In this embodiment, a first voltage pulse with a certain phase is applied to the first and second fixed electrodes 203 and 204 of the first substrate 206. A second voltage pulse with a phase earlier than the first voltage pulse is applied to the third fixed electrode 211, and a third voltage pulse with a phase later than the first voltage pulse is applied to the fourth fixed electrode 212, as illustrated in the timing chart shown in FIG. 8.

Figure 8:
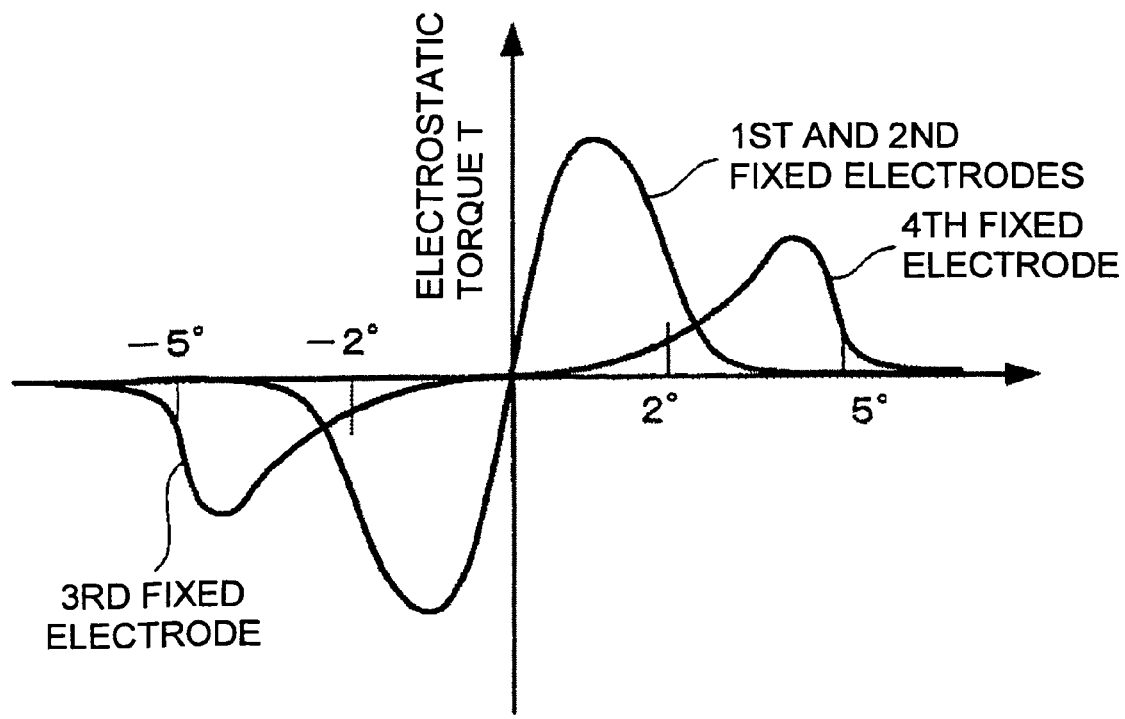
FIG. 8 is a graph showing a relationship between a sweep angle of the vibrating mirror and electrostatic torque generated between respective electrodes.

FIG. 8 is a graph showing electrostatic torque generated between electrodes as a function of sweep angle of the vibrating mirror 202.

Figure 9:
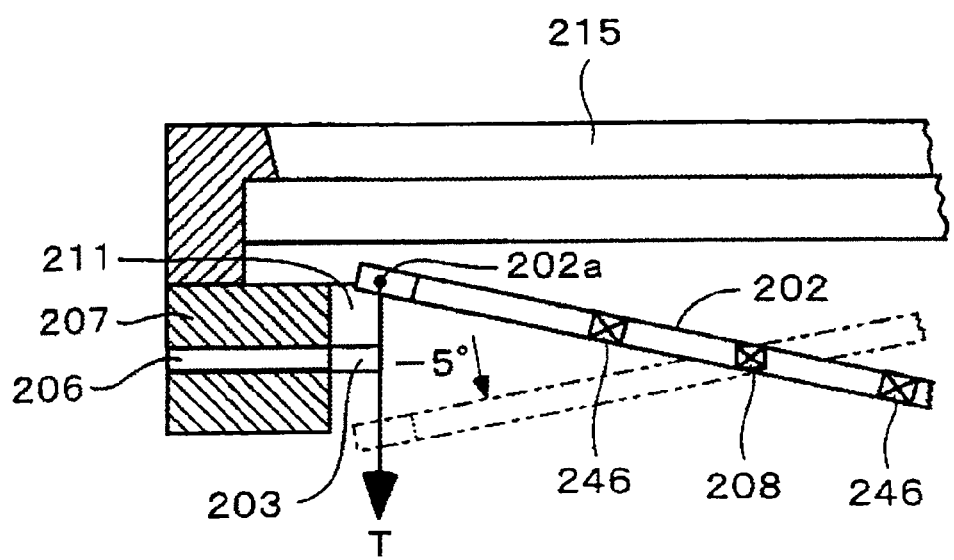
FIG. 9 is a cross-sectional view showing a main part of the electrode.

FIG. 9 is a cross-sectional view of the electrodes, where counterclockwise torque is in the positive direction. The vibrating mirror 202 is horizontal in the initial state. When the second voltage is applied to the third electrode 211, a negative electrostatic force is generated between the third electrode 211 and the moving electrode 202a of the vibrating mirror 202 facing the third electrode 211 in the negative direction. This electrostatic force causes the vibrating mirror 202 to rotate, while giving a twist to the torsion bar 208. The vibrating mirror 202 swings at such a sweep angle that balances with the return force of the torsion bar 208. When the voltage is turned off, the vibrating mirror 202 returns to the horizontal position due to the return force of the torsion bar 208. Before the vibrating mirror 202 reaches the horizontal position, the first voltage is applied to the first and second fixed electrodes 203 and 204 to generate an electrostatic force in the positive direction, and then the third voltage is applied to the fourth fixed electrode 212 to increase the electrostatic torque in the positive direction. By switching the voltage to be applied to the first through fourth fixed electrodes repeatedly, the vibrating mirror 202 swings at a sweep angle (about 2 degrees in this embodiment), passing between the comb teeth of each of the first and second fixed electrodes 203 and 204.

By adjusting the force of inertia of the moving mirror 202 and the width and the length of the torsion bar 208 such that the frequency agrees with a desired scanning frequency residing in the band of the primary resonant mode about the torsion bar 208 as the rotational axis, the amplitude of the oscillation is expanded through excitation. As a result, the sweep angle of the moving mirror 202 can be expanded in such a manner that the moving electrodes swing above the third and fourth fixed electrodes 211 and 212.

The moving mirror 202 correctly returns to the horizontal position under the electrostatic force generated in the positive direction by the third fixed electrode 211. With this arrangement, the sweep angle on which the electrostatic torque acts is increased, and therefore, a sufficient sweep angle is maintained even if the driving frequency is offset from the resonant frequency.

Figure 10:
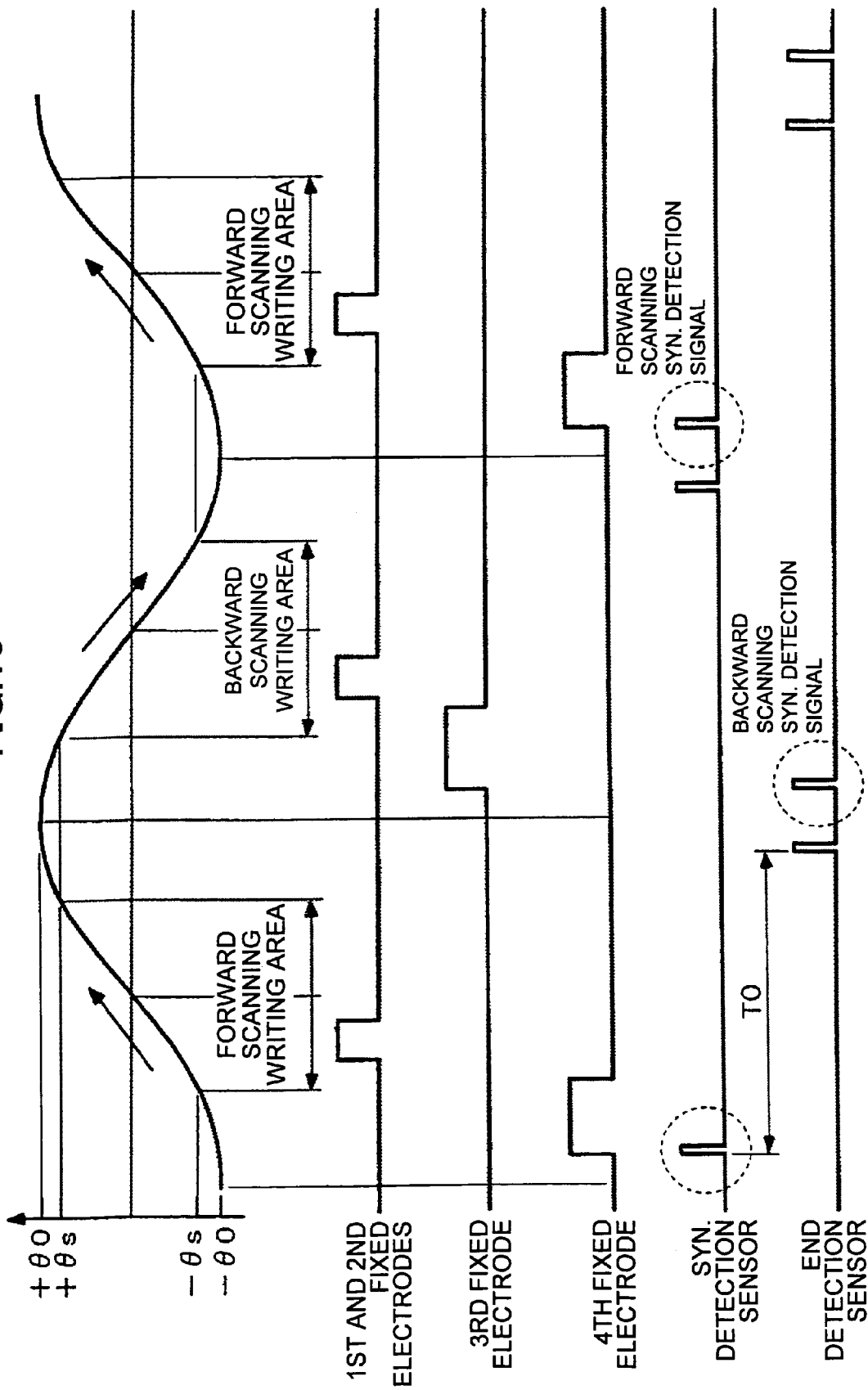
FIG. 10 is a timing chart of an applied pulse to respective fixed electrodes against amplitude.

FIG. 10 illustrates timing of pulses applied to the respective fixed electrodes in connection with the oscillation. It is preferable that voltage pulses be applied at the optimum timing with respect to the oscillation so that the phases of the applied pulses are determined with respect to the oscillation so as to generate the electrostatic torque in an efficient manner. The following are some conditions in connection with application of voltage pulses.

It is assumed that the thickness of the third and fourth fixed electrodes 211 and 212 (that is, the thickness of the second substrate 207) is "t", that the sweep angle of the moving mirror 202 is θ (θ=5 degrees, in this example), that the width of the mirror 202 is 2L (2L=4 mm, in this example), and that the thickness of the first substrate 206 is t0 (t0=60 μm, in this example). Then, the thickness "t" of the second substrate 207 is set so as to satisfy $$t0 < t < L \times \sin\theta$$

If θ0=arcsin (t0/L), the first pulse is applied to the first and second fixed electrodes 203 and 204 when the sweep angle is in the range of $0 < |\alpha 1| \leq \theta 0$, and the second and third pulses are applied to the third and fourth fixed electrodes 211 and 212, respectively, when the sweep angle is in the range of $\theta 0 < |\alpha 2| \leq \theta$.

Figure 11:
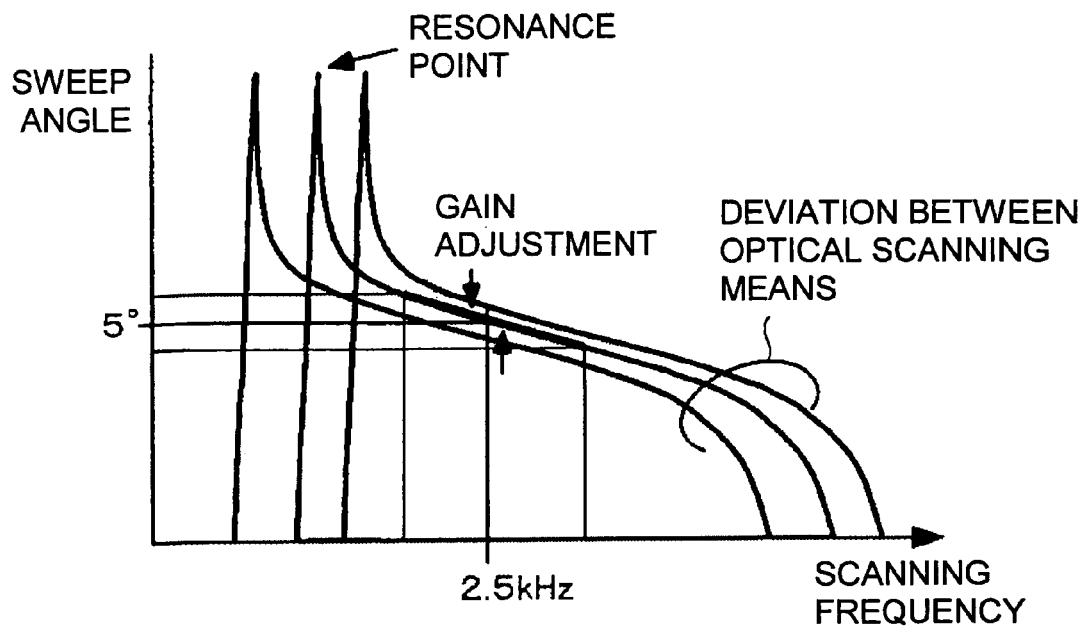
FIG. 11 is a graph showing a characteristic of a sweep angle against a driving frequency.

FIG. 11 is a graph showing the characteristic of the sweep angle with respect to the driving (or the scanning) frequency. When the driving frequency is consistent with the resonant frequency, the sweep angle becomes the maximum; however, it changes steeply near the resonant frequency.

This means that even if the driving frequency applied to the fixed electrode is set initially to the resonant frequency by the driving controller for the moving mirror 202, the sweep angle is likely to decrease easily when the resonant frequency varies due to, for example, temperature change.

Figure 12:
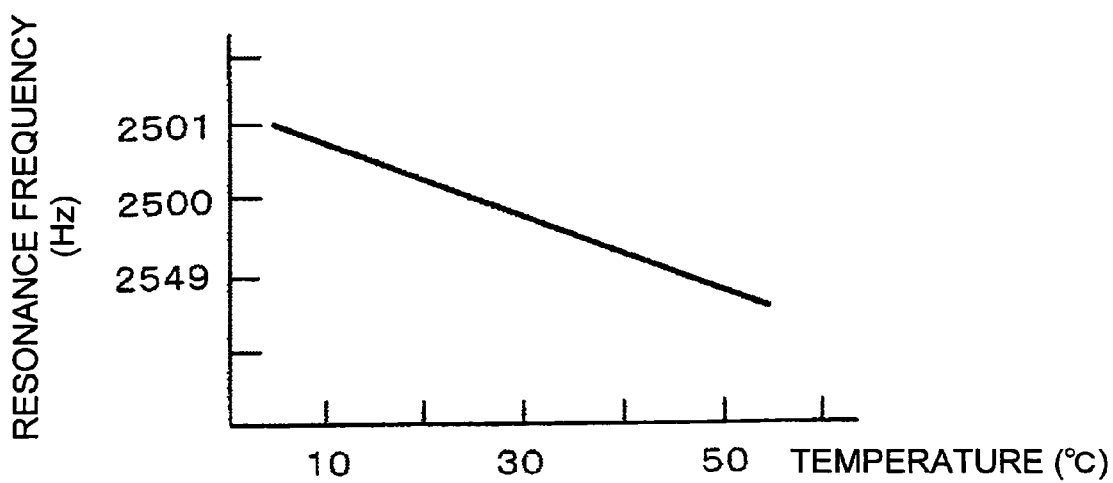
FIG. 12 is a graph showing a change of a resonance frequency against temperature.

In fact, the resonant frequency is affected by the temperature, as illustrated in FIG. 12. Such instability is disadvantageous. In addition, if multiple vibrating mirror modules are used in the optical scanning unit, the natural resonant frequency varies among the moving mirrors, and the mirrors do not operate at a common driving frequency.

Hence, in this embodiment, to avoid this disadvantage, the driving frequency is set to a frequency band near the resonant frequency, but slightly higher than the resonant frequency, in which frequency band the change in sweep angle is quite gentle. The driving frequency is set to 2.5 kHz when the resonant frequency is 2 kHz, and the sweep angle is set to ±5 degrees by adjusting the gain of the applied voltage.

For example, there is variation in resonant frequency due to machining error of moving mirrors (which is about 300 Hz in this embodiment), as well as change in resonant frequency due to temperature change (which is about 3 Hz in this embodiment). Taking such variations into account, it is desirable to set the driving frequency greater than or equal to 2.303 kHz, or less than or equal to 2.697 kHz for the resonant frequency of 2 kHz, so as not to conflict with the fluctuating resonant frequency.

If the dimensions of the moving mirror 202 are width 2a, height 2b, and thickness d, and if the torsion bar has a length L and a width c, the moment of inertia I and the spring constant K are expressed using the density ρ and the material constant G of silicon (Si).

$$I=(4ab\rho d/3) \times a^2$$

$$K=(G/2L) \times [cd \times (c^2+d^2)/12]$$

The resonant frequency f is expressed as $$f = (1/2\pi) \times (K/I)^{1/2}$$
$$= (1/2\pi) \times [Gcd \times (c^2 + d^2)/24LI]^{1/2}$$

Since the sweep angle θ is in proportion to the length L of the torsion bar, the sweep angle is expressed as $$\theta = A/If^2$$

where A denotes a constant. The sweep angle θ is inversely proportional to the inertial moment I. In order to raise the resonant frequency f, the inertial moment I has to be decreased; otherwise the sweep angle becomes small.

In this embodiment, the inertial moment I is reduced to about one fifth (⅕) by reducing the thickness d of the moving mirror 202 down to d/10 or thinner by etching the moving mirror from the back face (opposite to the reflecting surface).

Figure 13:
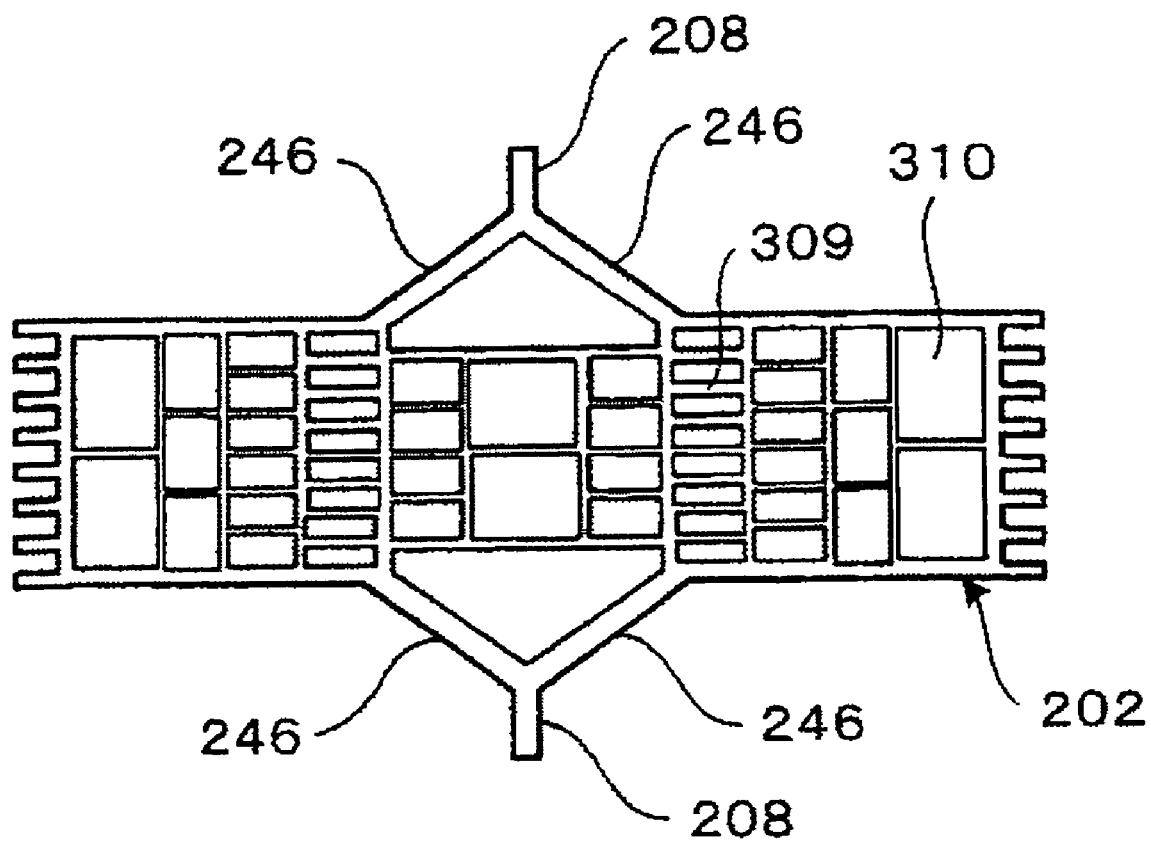
FIG. 13 is a schematic plan view showing a hollow state of the vibrating mirror.
Figure 14:
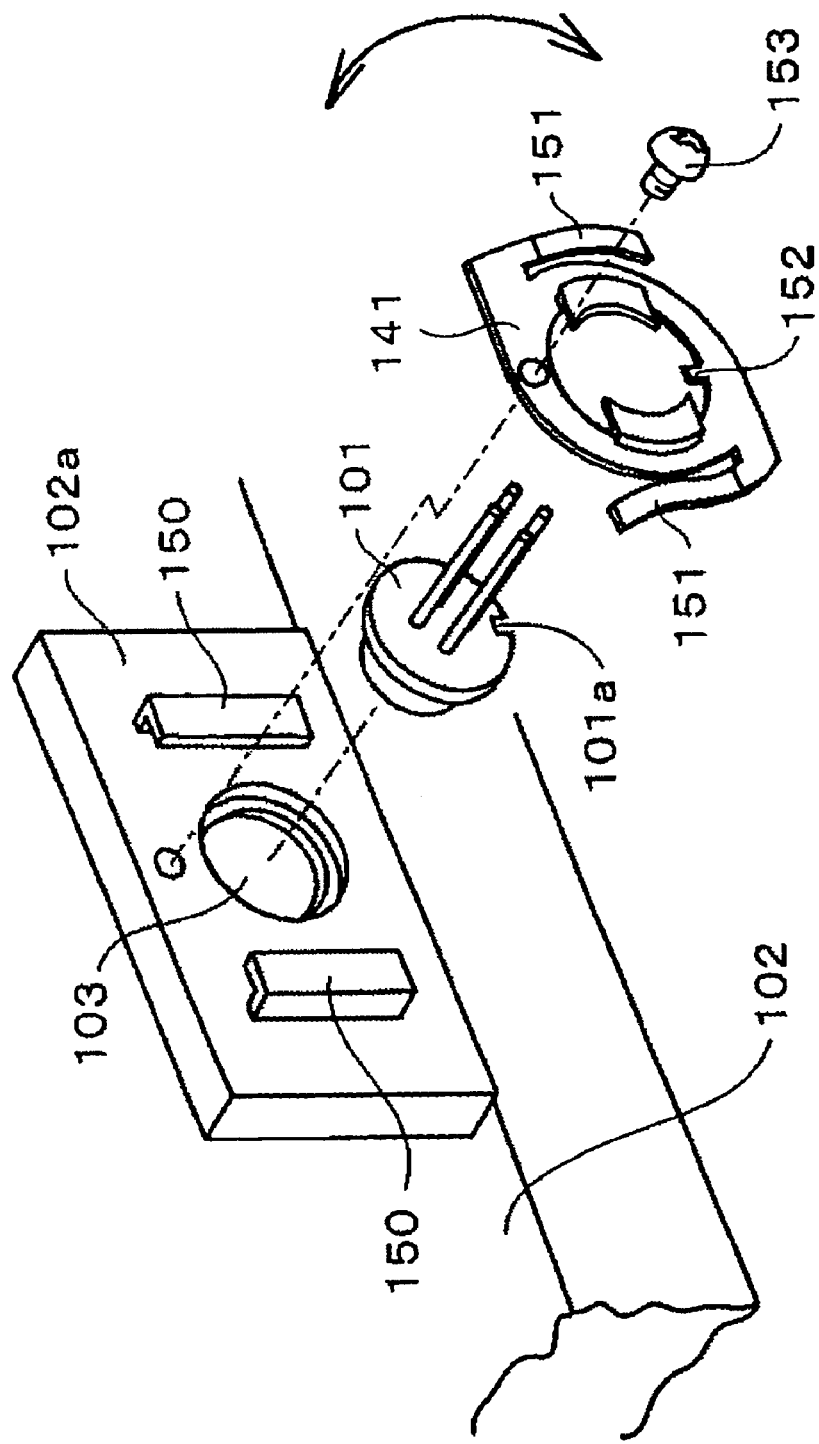
FIG. 14 is a perspective view showing an installation structure of a semiconductor laser.

Referring to FIG. 13, the stresses applied to the substrate at the time of rotation are distributed wherein the stress is maximum at the approximately one sixth (⅙) of both wing widths in a direction perpendicular to and away from the rotational axis 245. Therefore, the number of ribs 308 is changed to six steps (decreasing stress). In an area where the stress is large, the number of the ribs is increased so that rigidity is secured. In the periphery of the mirror where the inertial force is large, an area of a hollow part 310 is increased so that mass is reduced as corresponding to the distance from the rotational axis. The variation in parameters defining the inertial moment I and size error of the torsion bar 208 cause the resonant frequency to vary among moving mirrors 202.

On the other hand, the electrostatic force F between electrodes is expressed as $$F=\epsilon HV^2/2\delta$$

where ε is the permittivity of the air, H is the length of the electrode, V is the applied voltage, and δ is the distance between the electrodes. The sweep angle θ is expressed also as $$\theta = B \times F/I$$

where B is a constant. The longer the length H of the electrode, the greater the sweep angle θ is. Accordingly, by shaping the electrode into comb-teeth, the driving torque can be increased to 2n times as great as an ordinary one, where n is the number of comb teeth. Thus, by increasing the length of the periphery of the electrode as much as possible, high electrostatic torque can be produced at a relatively low voltage.

Meanwhile, the viscosity resistance P of the air is expressed as $$P = C \times \eta v^2 \times E^3$$

where $v$ is the velocity of the vibrating mirror 202, E is the area of the mirror, $\eta$ is the density of the air, and C is a constant.

The viscosity resistance. P affects the rotation of the moving mirror. To prevent the influence of the viscosity resistance, it is desirable to place the vibrating mirror 202 in an evacuated and sealed housing.

Returning to FIG. 4, the vibrating mirror substrate 200, which includes the first substrate 206 and the second substrate 207, is bonded to a ceramic board 213 having an opening in the center. The ceramic board 213 with the vibrating mirror substrate is then mounted on the base 250 of the CAN package such that the reflecting surface of the moving mirror faces up and that the rotational axis 245 of the moving mirror 202 is aligned with the line connecting a pair of V-shaped notches 250a formed in the periphery of the base 250.

Lead terminals 216 penetrate through the base 250. Electrode pads connected to the electrodes are formed in the islands 224 and 225 of the second substrate 207 by removing the insulating layer. Other electrode pads connected to the islands 221, 222, and 223 of the first substrate 206 are also formed by filling through holes 226, 227, 228 of the second substrate 207 with metal paste via an insulating film. These electrode pads are wire-bonded to the lead terminals 216.

A cap 242 is placed over a step 243 of the base 250. The base 250 and the cap 242 are sealed under a partial vacuum environment so as to maintain the pressure of the inner space of the cap 242 at or below 1 torr.

The light beam is guided onto and from a slit opening 213 formed in a counterpart mirror 215. The counterpart mirror 215 is arranged above the second substrate 207 so as to face the vibrating mirror 202.

The counterpart mirror 215 is formed of a transparent resin, and has a pair of roof wings extending on both sides of the slit opening 219. The roof wings are tilted so as to make an angle of 144.7 degrees between them. A metal film is formed by evaporation so as to define reflecting surfaces 217 and 218 over a pair of slopes inclining at 9 degrees and 26.3 degrees, respectively, with respect to the second substrate 207.

The bottom of the counterpart mirror 215 is parallel to the vibrating mirror 202, and bonded to the top face of the fixed frame of the second substrate 207. The second substrate 207 has positioning holes 214 formed by etching on both sides. See FIG. 6. Pins 241 projecting from the bottom of the counterpart mirror 215 are inserted in the positioning holes 214 to accurately hold the counterpart mirror 215 so as to be perpendicular to the rotational axis 245.

Figure 7:
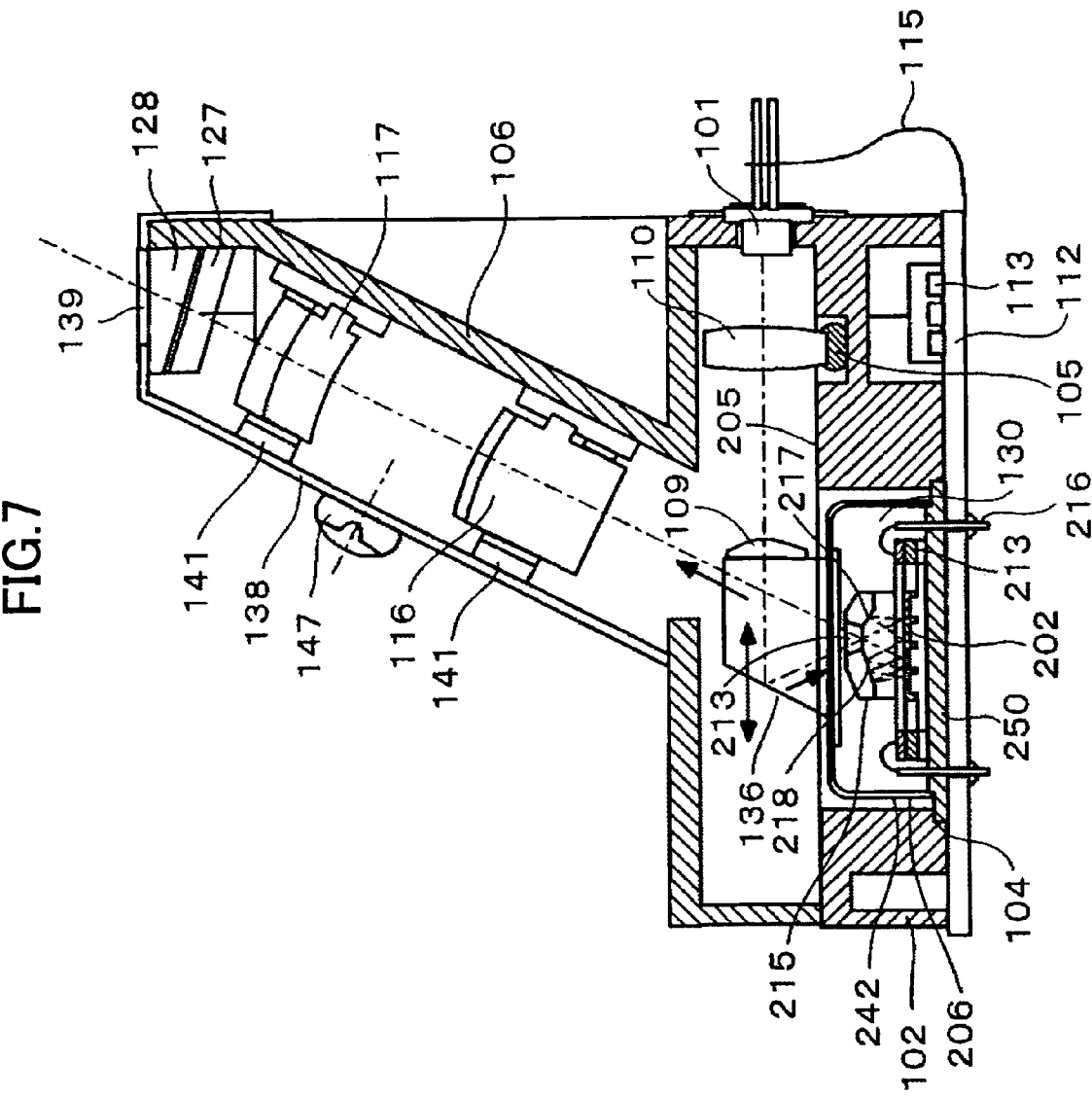
FIG. 7 is a cross-sectional view in a sub-scanning direction of the optical scanning unit.

FIG. 7 is a sub-scanning cross-sectional view of the optical scanning unit. The light beam emitted from a semiconductor laser 101 is incident on the vibrating mirror 202 via a coupling lens 110 and an incident prism 136. The light beam passes through the slit opening 219 and is incident on the vibrating mirror 202 at an angle of about 20 degrees inclining in the sub-scanning direction with respect to the normal line, within the sub-scanning cross section containing the torsion bar 208. The light beam reflected from the vibrating mirror 202 is further reflected from a first reflecting surface 217 back to the vibrating mirror 202. The light beam is again reflected from the vibrating mirror 202 and then strikes a second reflecting surface 218. The light beam is reflected back and forth three times between the second reflecting surface 218 and the vibrating mirror 202, while shifting the reflecting position in the slow-scan direction. After the light beam is reflected five times from the vibrating mirror 202, the light beam exits through the slit opening 219.

Several times of reflection at the vibrating mirror 202 guarantees a sufficient scanning angle, while reducing the optical path length, even if the sweep angle of the vibrating mirror 202 is small. The incident prism 136 is adjusted in a direction shown by an arrow and connected so that an incident position of the light beam is adjusted.

If the number of reflections at the vibrating mirror 202 is N, and if the sweep angle is $\alpha$, the scanning angle $\theta$ is expressed as $\theta = 2N\alpha$.

In this embodiment, N=5 and $\alpha$=5 degrees, and therefore, the maximum scanning angle becomes 50 degrees, of which 25 degrees is assigned to the image recording range. Oscillation making use of resonance requires only a small level of applied voltage with less heat generation. However, as the recording rate (that is, the resonant frequency) increases, the spring constant K of the torsion bar 208 has to be increased, which makes the sweep angle narrower. To avoid such inconvenience, the counterpart mirror 215 is provided to expand the scanning angle through reflection. This arrangement can guarantee a sufficient scanning angle regardless of the recording speed.

Since roof-like reflecting surfaces are provided to the counterpart mirror 215, the incident angle of the beam on the vibrating mirror 202 in the sub-scanning direction is switched between the positive and negative directions (such that the reflected beam heads to the right and to the left alternately) at every reflection. This arrangement can prevent the scanning line from bending on the scanned plane due to oblique incidence, and maintain the scanning line straight. In addition, since the rotation of the light flux having occurred within a plane perpendicular to the optical axis returns to the original state, imaging performance can be maintained high.

Figure 1:
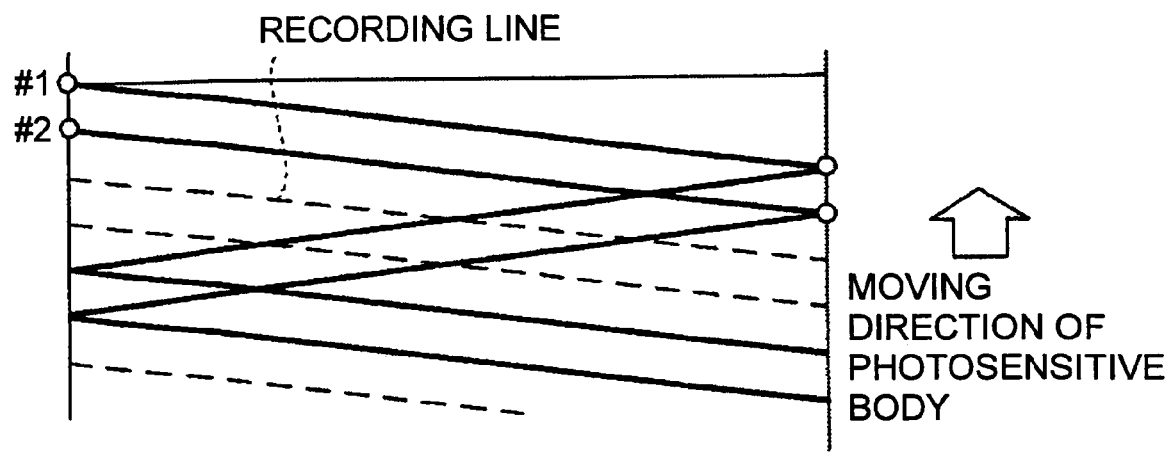
FIG. 1 is a view showing a problem caused by simultaneous scanning by a light beam from plural light emitting sources in the conventional art.
Figure 2:
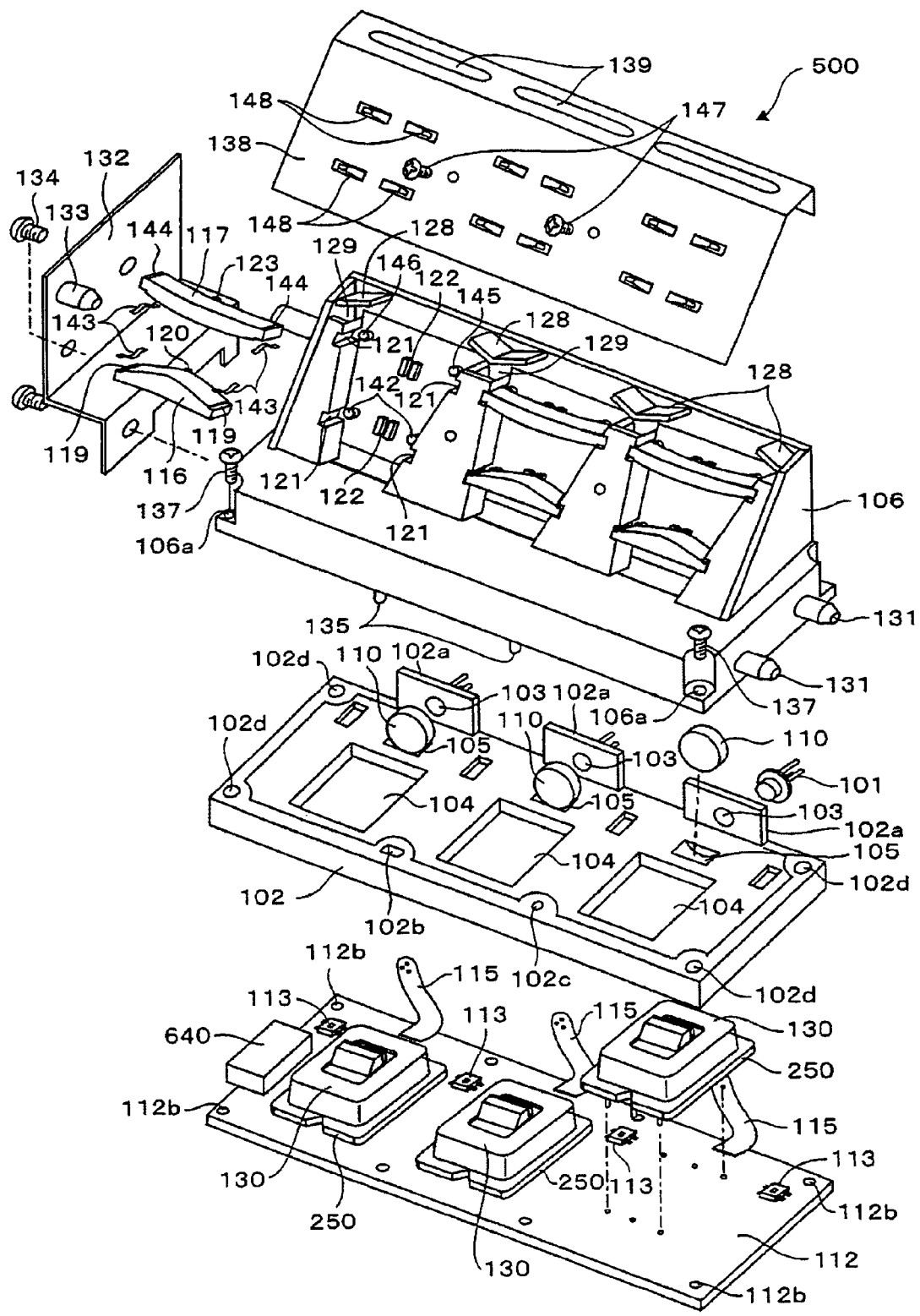
FIG. 2 is an exploded perspective view of an optical scanning unit according to a first embodiment of the present invention.
Figure 3:
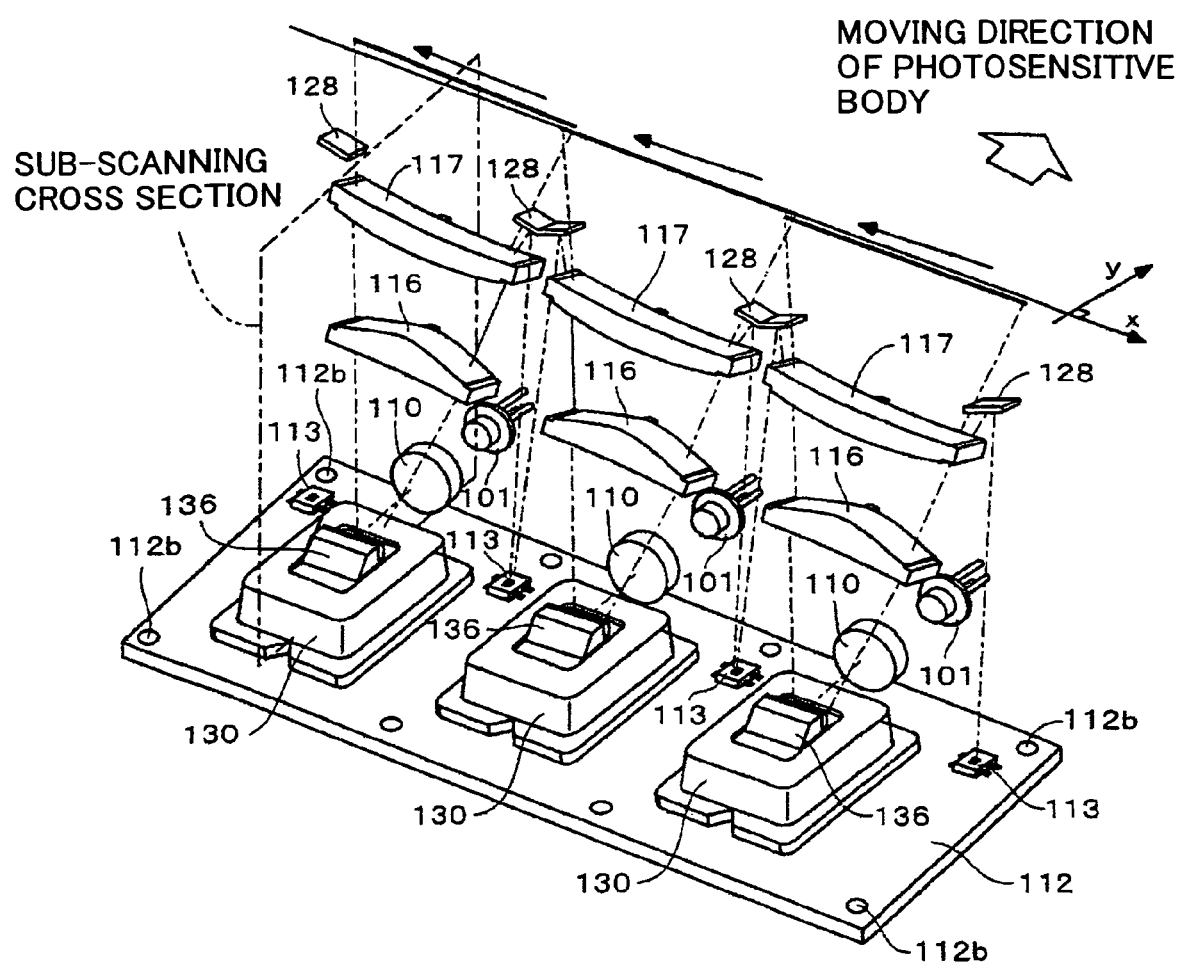
FIG. 3 is a perspective view showing a position relationship between a vibrating mirror module and a scanning lens.

FIG. 2 is an exploded perspective view of an optical scanning unit according to this embodiment of the present invention. FIG. 3 is a perspective view showing a position relationship between a vibrating mirror module and a scanning lens.

In the semiconductor layer 101 used as the light source of the optical scanning, two light-emitting sources are formed monolithically at a pitch of 50 μm in the sub-scanning direction. The semiconductor laser 101 is fit into a stepped through-hole 103, which is formed in the standing wall 102a of a frame member 102, from the back face of the wall 102a, based on the periphery of the stem of the semiconductor laser 101 as the reference. The optical axis is positioned by pushing the flange of the semiconductor laser 101 against the step in the through-hole 103. Then the semiconductor laser 101 is pressed and fixed from the rear side by a retainer plate 141.

When fixing the semiconductor laser 101, the projection 152 of the retainer plate 141 is fit into the cutaway 101a in the periphery of the stem of the semiconductor laser 101, and the stem is rotated about the center axis of the through-hole 103 so as to bring a pair of leaf springs 151 to be engaged with the hooks 150 formed on the frame 102. The semiconductor laser 101 pushed into the through-hole 103 is adjusted such that the aligning line of the light-emitting sources inclines a predetermined amount from the fast scan direction. Then, the semiconductor laser 101 is fixed by a screw 153 to prevent rotation.

Referring back to FIG. 2, a coupling lens 110 is fit into the U-shaped recess 105 using ultra-violet (UV) setting adhesive, and the light-emitting point is correctly positioned along the optical axis such that the optical axis of the coupling lens 110 aligns with the exit axis of the semiconductor laser 101, and that the outgoing beam becomes parallel flux. After the positioning, the UV adhesive placed between the recess 105 and the coupling lens 110 is hardened.

The positioning of the coupling lens 110 may be carried out after the vibrating mirror modules 130 and the cylinder lens 109 are assembled. In this case, variation in the surface accuracy of the vibrating mirror 202 and offset of the focusing point of the cylinder lens 109 can be cancelled by adjusting the coupling lens 110. In other words, the accuracy requirement can be eased. In the embodiment, three light sources with the same structures are used.

The two parallel light fluxes having passed through the coupling lens 110 strike the incident prism 136 attached to the window of the vibrating mirror module 130, via the cylinder mirror 109 which is bonded to the a couple of installation tilt surfaces and has a positive curvature in the sub-scanning direction. The light fluxes are guided into the slit 213 of the vibrating mirror module 130 as the focusing flux converging on the vibrating mirror surface in the sub-scanning direction.

Figure 15:
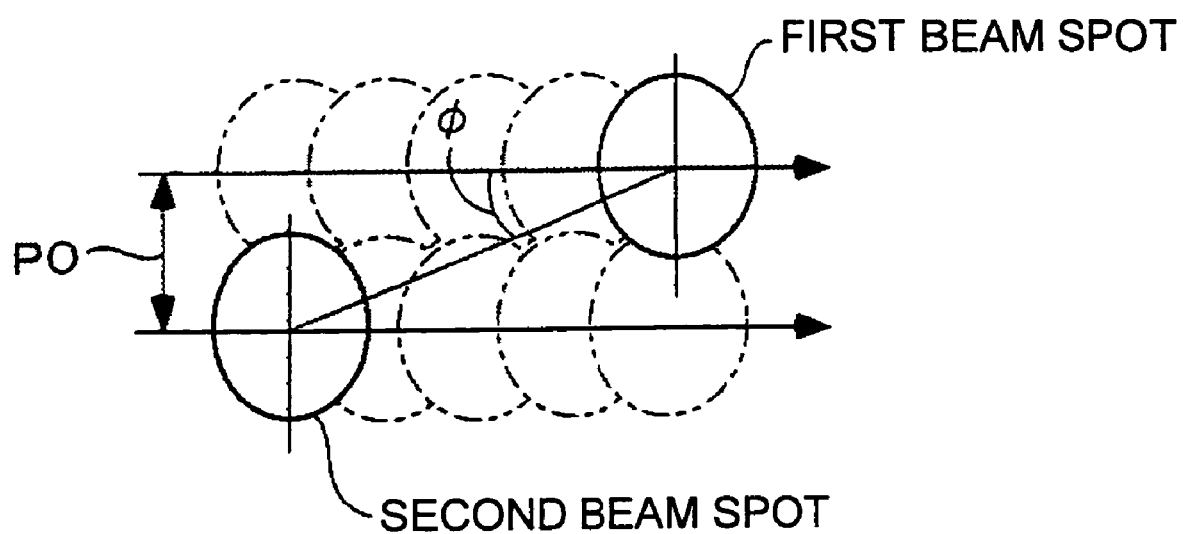
FIG. 15 is a view showing an arrangement of a beam spot on a scanned surface.

FIG. 15 shows beam spots formed on the scanned plane. The space P between the beam spots of the first and second beams is determined by assembling the semiconductor laser 101 while adjusting the inclination of the semiconductor laser 101. The space P is expressed as $$P = \beta \times p \times \sin \phi$$

where β is the sub-scanning magnification of the entire system from the light source to the scanned plane, including the first and second scan lens 116 and 117 (shown in FIG. 2), and p is the pitch p of the two light-emitting sources of the semiconductor laser. The space P between beam spots is adjusted according to the amount of correction for line inclination formed on the transfer belt, which is described below.

As shown in FIG. 2, the vibrating mirror module 130 is fit into the stepped square hole 104 formed in the frame member 102 from the bottom, and positioned with reference to the outer edge of the base 250 with the flange pushed against the step of the square hole 104. In this example, three vibrating mirror modules 130 are positioned in the single frame 102 at even intervals.

Each of the vibrating mirror modules 130 is attached to the print board 112 by inserting the lead terminals 216 projecting from the bottom of the base 250 into the holes of the print board 112 and soldering. The top face of the print board 112 is pushed against and fixed to the frame member 102 so as to block the bottom opening of the frame member 102, thereby accomplishing circuit connection.

On the print board 112, electronic components forming laser driving circuits of the semiconductor laser 101 and driving circuits of the vibrating mirror 102, as well as synchronization detection sensor 113, are mounted. Wiring to the external circuit is implemented collectively. The cable 115, one end of which is coupled to the print board 112, is connected to the lead terminal of the semiconductor laser 101.

The top face of the frame member 102 is parallel to the step formed in the rear side of the square hole 104, against which the flange of the vibrating mirror module 130 is abutted in the normal line direction of the mirror. Two projections 135 extending from the bottom of the housing 106 are fit into the corresponding holes 102b and 102c of the frame member 102, and positioned within the plane. Then, the housing 106 is attached by screws 137 at four corners.

In this embodiment, the housing 106 is screwed to the print board 112 via the through-hole 106a of the housing 106 and the through hole 102d of the frame member 102, and the housing 106 and the print board 112 are put together with the frame member 102 inserted between them. Finally, soldering is carried out.

A first scanning lens 116 and a second scanning lens 117, namely image-formation means, are arranged on the housing 106 in the main-scan direction. The first scanning lens 116 and the second scanning lens 117 are positioned such that the respective scanning ranges slightly overlap each other.

The first scanning lens 116 has a projection 120 projecting at the center of the sub-scanning direction reference surface and used for positioning in the main-scanning direction, as flat faces 119 are provided on both ends for positioning in the optical axis direction. The projection 120 and the flat faces 119 are provided on both the incident side and the exit side of the first scanning lens 116. The projection 120 is fit into the groove 122 monolithically formed in the housing 106. The flat faces 119 are inserted in a pair of grooves 121. The first scanning lens 116 is pressed by the leaf springs 143 toward the incident side, and maintained in this plane. In this manner, relative positions of the first scanning lenses 116 are aligned within a plane perpendicular to the optical axis where the positioning is carried out. By pushing the sub-scanning direction reference surfaces of the first scanning lens 116 against a pair of projections 142 projecting from the housing 106, the height in the sub-scanning direction is determined within the plane perpendicular to the optical axis. The first scanning lens 116 is finally supported by the leaf springs 148 integrally formed in the cover 138.

The second scanning lens 117 has a projection 123 projecting at the center of the sub-scanning direction reference surface and used for positioning in the main scanning direction, as flat faces 144 provided on both ends for positioning in the optical axis direction. The projection 123 is fit into the groove 122 monolithically formed in the housing 106. The flat faces 144 are inserted in a pair of grooves 121. The second scanning lens 117 is pressed by the leaf springs 143 toward the exit side, and maintained in this plane. The sub-scanning reference surface of the second scanning lens 117 is pressed against a pair of projections 145 and 146 projecting from the housing 106 in order to determine the height in the slow-scan direction. The second scanning lens 117 is finally supported by the leaf springs 148 integrally formed in the cover 138.

A total of four sync detection sensors 113 are provided on the print board 112. Two of them are located at corresponding ends of the print board 112 and the other two are placed between two adjacent vibrating mirror modules 130. With this arrangement, the beam is detected at the beginning point and the end point of each vibrating mirror module (optical scanning means) 130. On the exit side of the second scanning lenses 117, V-shaped mirror seats 128 are formed in the housing 106 between scanning ranges of two adjacent scanning lenses 117. A high-brilliance aluminum thin film is bonded to each of the mirror seats 128 to reflect the light beam to the associated sync detection sensor 113 via the opening 129 formed between scanning ranges and the square holes formed in the frame member 102. The reflecting face of one wing of the V-shaped mirror seat 128 faces the scan beginning position of one second scanning lens 117, and the reflecting face of the other wing of the V-shaped mirror seat 128 faces the scan end position of the adjacent second scanning lens 117.

The cover 138 has openings 139 through which the light beams pass. The cover 138 is screwed to the housing 106 tightly so as to press the first and second scanning lenses 116 and 117 by leaf springs 148.

Figure 16:
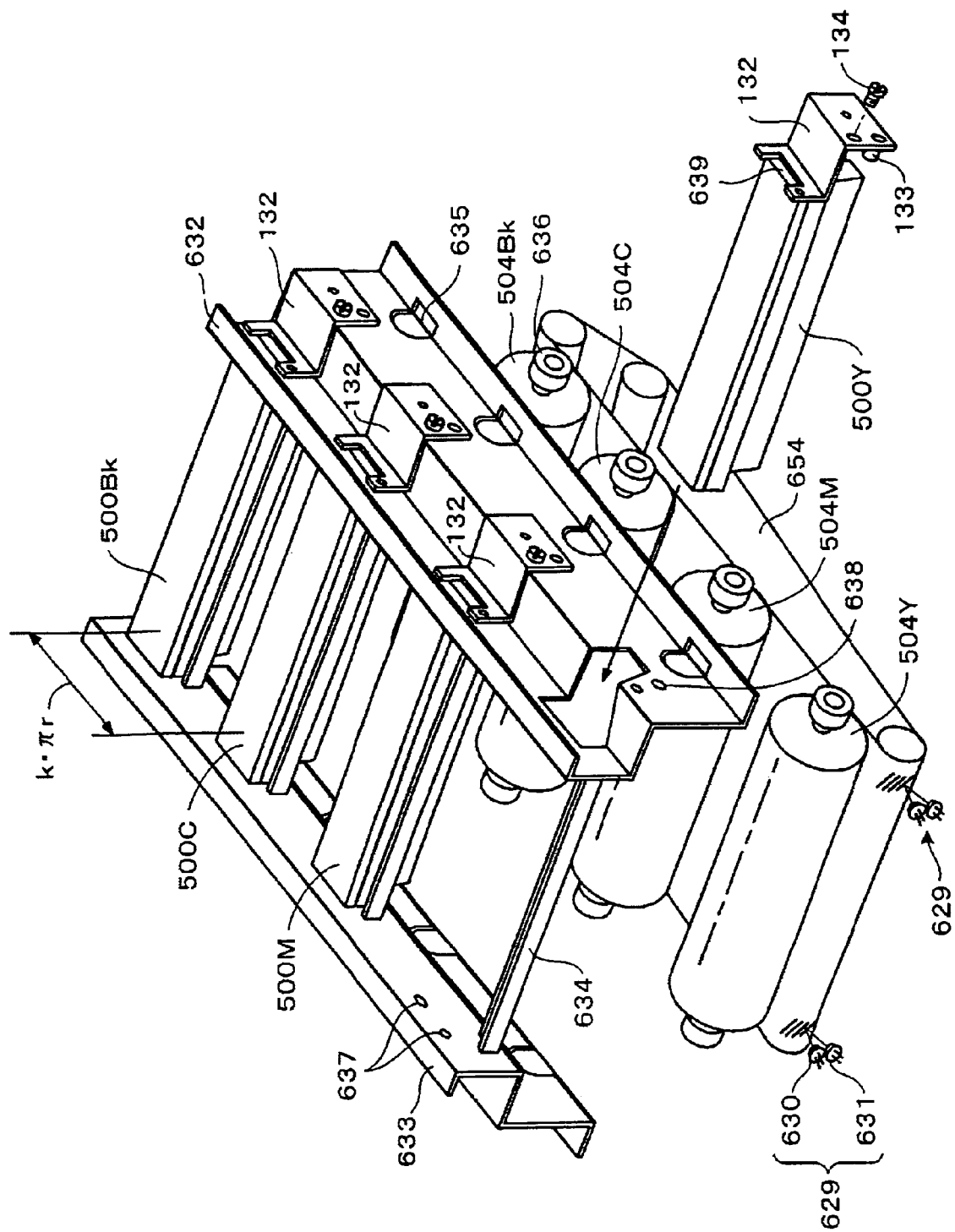
FIG. 16 is a perspective view showing an arrangement relationship between a photosensitive drum and the optical scanning unit.

FIG. 16 is a perspective view showing a positioning method of the photosensitive drum 504 and the optical scanning unit 500. The frame member 102 and the housing 106 are formed by glass-fibered reinforced resin or aluminum diecast. A pair of positioning pins is formed at a depth side surface (front side surface in FIG. 2) of the housing 106.

Since the optical scanning units 500Y, 500M, 500C and 500Bk irradiate beam downward, the optical scanning units 500Y, 500M, 500C and 500Bk are arranged where front and back and right and left thereof are turned over.

A step bending surface plate 132 is arranged on a front side surface (depth side surface in FIG. 2) of the housing 106. The optical scanning unit 500Y is inserted from a side of the front side plate 632 along a guide plate 634 provided by bridging the side plates 632 and 633 facing each other in the main-scanning direction. The positioning pins 131 are fitted into positioning holes 637 (one is a reference hole and the other is an elongated hole) of the depth side plate 633. In addition, the positioning pin 133 standing on the surface plate 132 is fitted into the positioning hole 638 of the front side plate 632 so that the surface plate 132 contacts and is fixed by the screw 134.

At this time, if the positioning hole 638 is an elongdated hole, an angle between the longitudinal direction of the housing 106 and the photosensitive body axis can be adjusted so that an inclination of the scanning line can be corrected.

The connector 640 of a printed board 112 is visible from a notch part 639 of a surface plate 132 and wiring connection is done after the connector 640 is mounted. The fixing side plates 632 and 633 are formed by using sheet metal. The notch parts 635 are formed in the fixed side plates 632 and 633 so as to position a bearing 636 of the photosensitive drum 504. By engaging the fixing side plates 632 and 633, positioning precision of the photosensitive drums 504 and an arrangement with the housing 106 is maintained. In FIG. 16, numerical reference 629 represents a detector as a skew detection part configured to read the toner formed on the intermediate transfer belt 501, numerical reference 630 represents an LED light source projecting a detection light, and numerical reference 631 represents a photo sensor receiving a reflection light.

Figure 17:
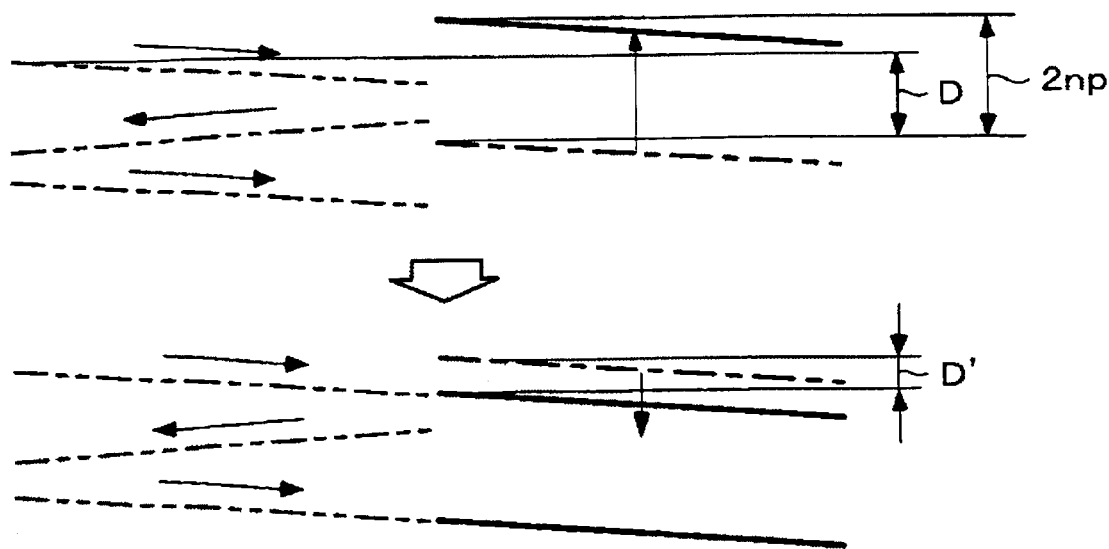
FIG. 17 is a view showing a joint correction method of a line image by optical scanning means.

FIG. 17 is a view showing a joint correction method of a line image by optical scanning means. For the convenience for explanation, an example where a difference of write starting positions of plural n light emitting sources is zero is shown in FIG. 17.

It is assumed that recording positions of neighboring optical scanning means are shifted by a length D.

In this case, correction is applied so as to make D=0. Correction means first corrects writing timing of the scanning line by a unit of 2n times the line pitch P. More specifically, by selecting a synchronization detection signal for reading the image data, the timing is shifted for every k times of the one period T. "k" is a natural number. "k" wherein "L−k×2nP" is nearest to zero is selected. Next, the remaining is corrected by a unit of 2nP/m by shifting an amplitude phase of the vibrating mirror 202 for every 1/m times of one period T. "m" is a natural number. "m" wherein "L−2nP×(k+1/m)" is nearest to zero is selected.

Thus, the line image to be recorded in the neighboring areas on the transfer belt can be joined (superposed).

Meanwhile, since the vibrating mirror 202 is resonance-vibrated, the scanning angle θ is changed in a sine-wave shape.

On the other hand, it is necessary to print a main scanning dot with a uniform gap on the photosensitive drum surface as a scanned surface. Hence, the direction of the light should be corrected so that an image forming characteristic of the scanning lens 116 and 117, namely a scanning distance per unit scanning angle, $dH/d\theta$ is proportional to $\sin^{-1}\theta/\theta 0$, that is, the speed is higher in the center of image and is lower in the periphery of the image. Therefore, the scanning lens wherein the power is distributed as the image forming point is made further from the center to the periphery is used. However, there is a limitation to widening the effective scanning area θs against the amplitude θ0.

Figure 18:
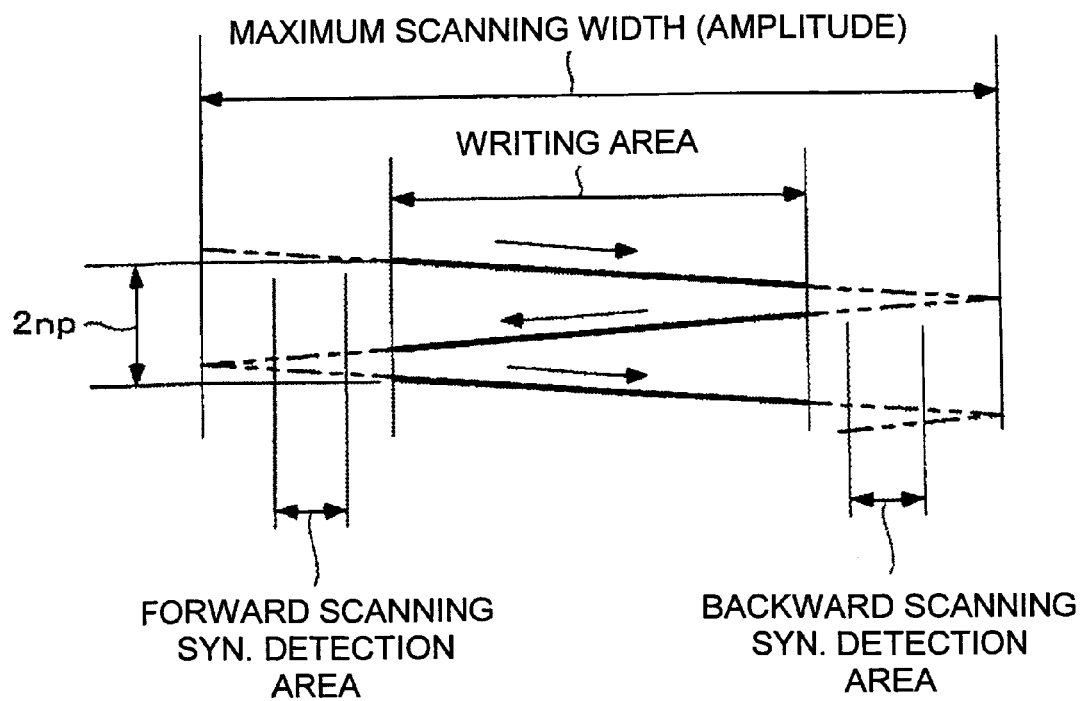
FIG. 18 is a view showing that only ½ of a maximum sweep angle is used for writing an image.

In addition, it is necessary to secure an area for obtaining synchronization detection signal to recognize the time for image writing at an outside of scan starting ends of reciprocating scanning. Therefore, in order to separate the signal by reciprocating scanning, as shown in FIG. 18, only a half of the maximum sweep angle (amplitude θ0) is used for image writing. That is, the ratio of the effective scanning area θs against the amplitude θ0 is equal to or less than 50%.

Figure 19:
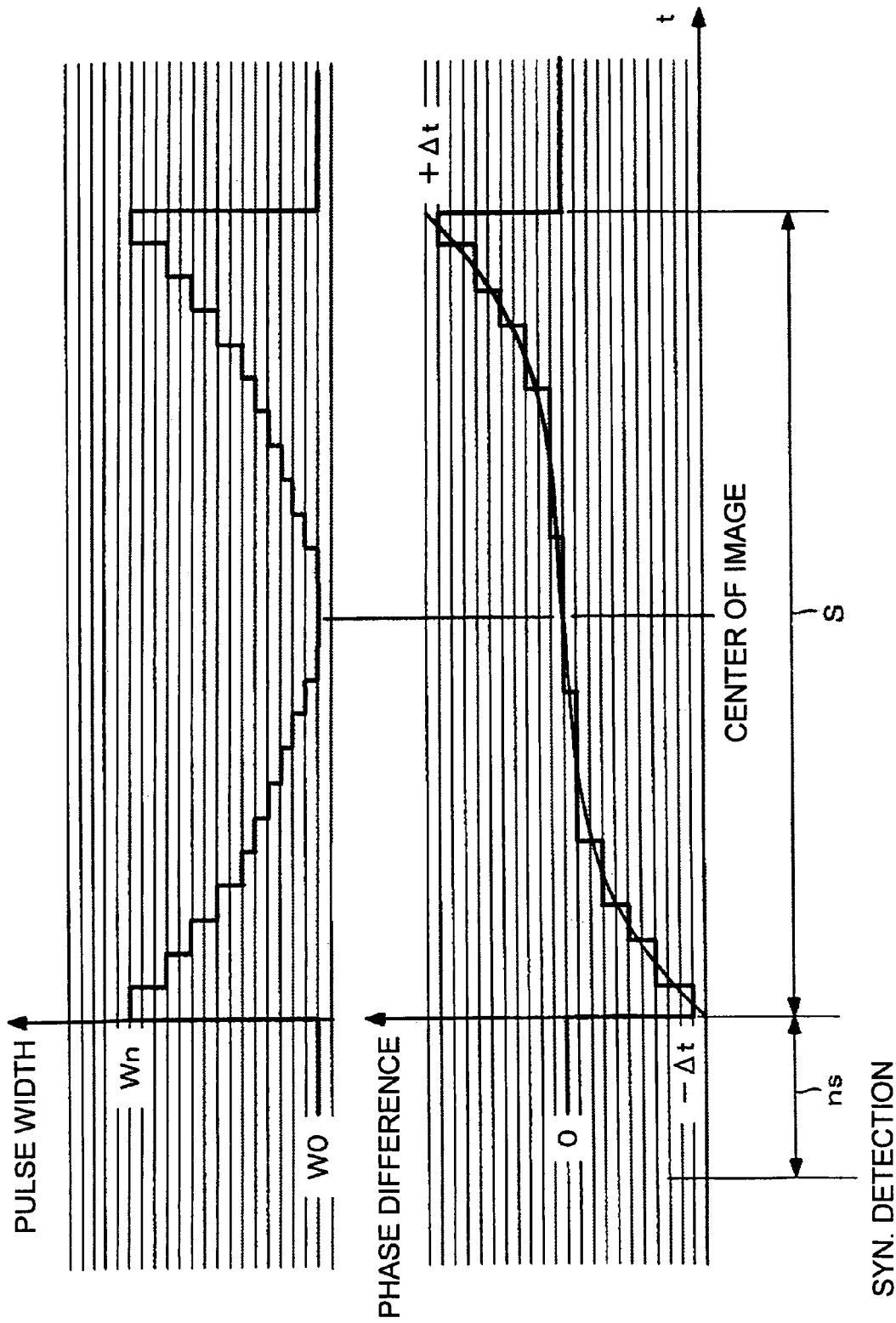
FIG. 19 is a view showing a method for making a main scanning dot space of pixels uniform.

In addition, as shown in FIG. 19, the phase corresponding to the pixel for the change of the scanning speed by the amplitude is gradually delayed from a state between the writing start and writing end. Furthermore, a pixel clock fm is given by the LD driving part (See FIG. 23) so that the pulse width of the pixel is gradually shortened in an area between the writing start and writing end and, on the other hand, the pulse width of the pixel is lengthened in an area from the center of the image to the writing end.

Thus, by adding electronic correction, a gap of the main scanning dot of the pixel is made uniform so that unevenness of the light and shade is not conspicuous.

In this embodiment, the semiconductor laser 101 is used as a semiconductor laser array having two light emitting sources. However, the present invention is not limited to this. The beam from the semiconductor laser of a single light emitting source may be composed. Two or more light emitting sources may be used.

Figure 20:
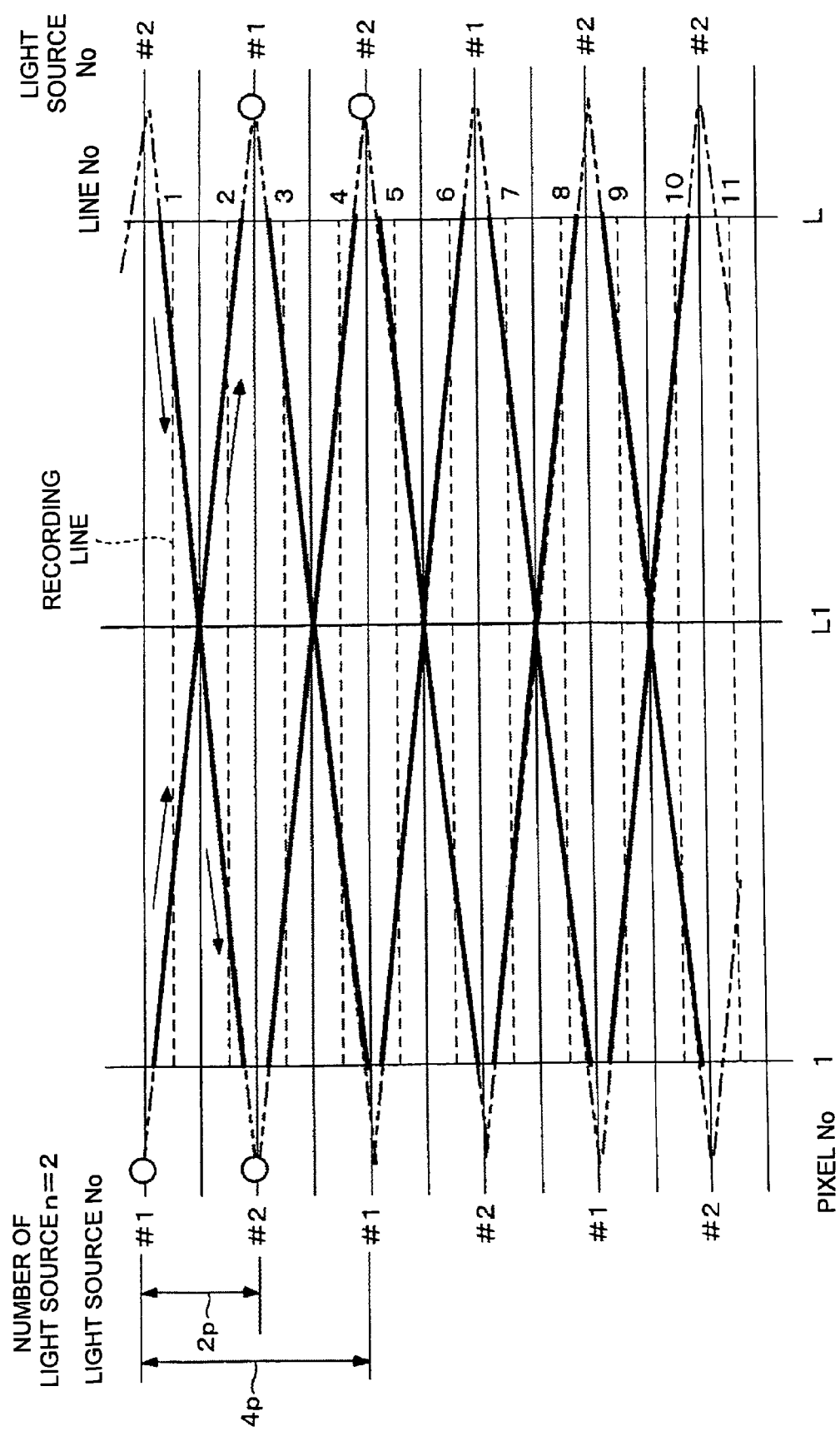
FIG. 20 is a view for explaining a structure of the image data for respective recording lines where a light emitting source n is 2.
Figure 21:
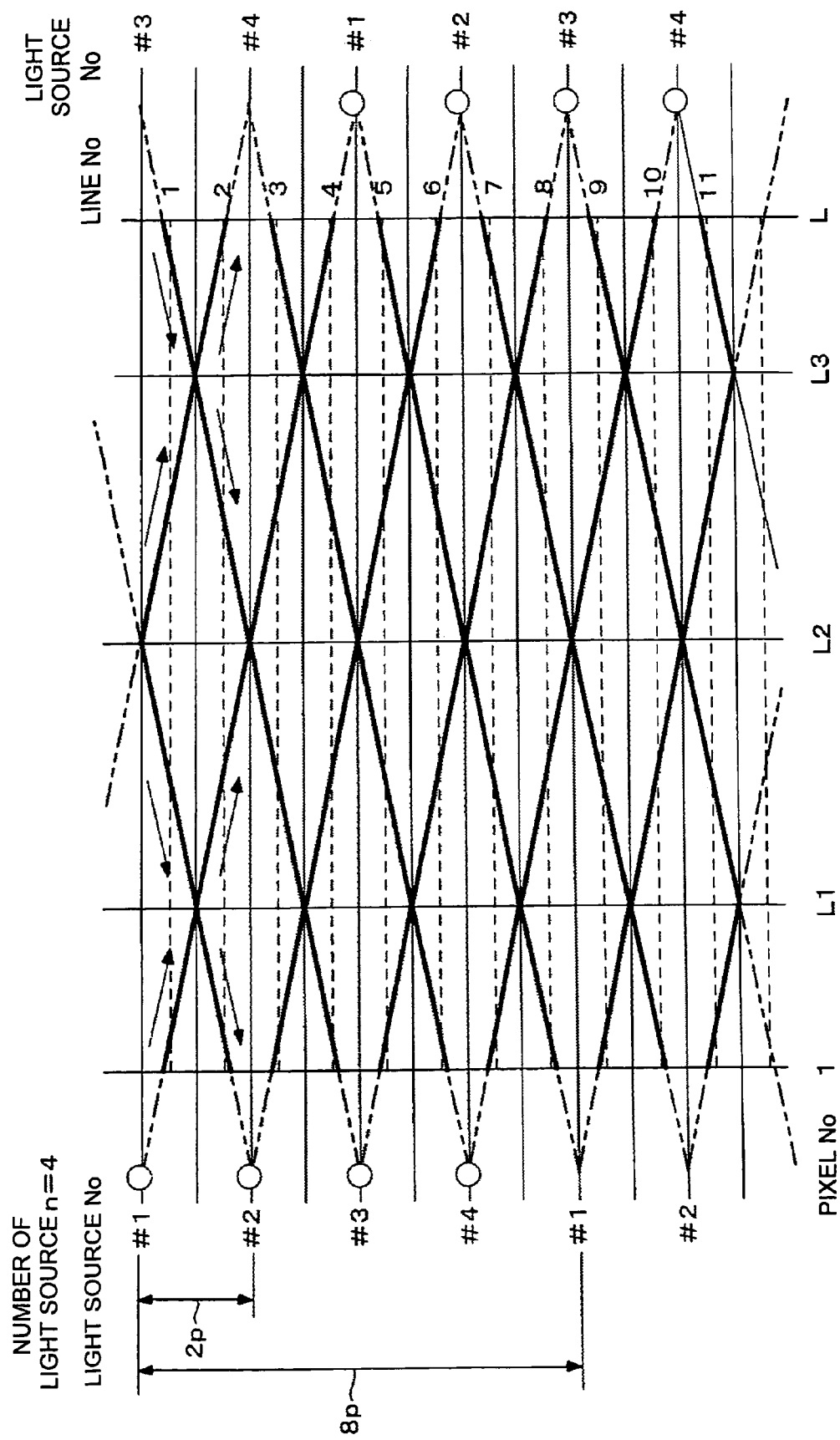
FIG. 21 is a view for explaining a structure of the image data for respective recording lines where a light emitting source n is 4.

FIG. 20 is a view for explaining a structure of the image data for respective recording lines in a state where a light emitting source n is 2. FIG. 21 is a view for explaining a structure of the image data for respective recording lines in a state where a light emitting source n is 4.

In cases shown in both FIG. 20 and FIG. 21, pitches between plural beams on the photosensitive drum surface are set to be twice the line pitch P corresponding to the recording density. That is, scanning is implemented while no scanning is implemented for 2nP lines for every reciprocating scanning of the vibrating mirror 202. That is, the recording speed of this embodiment is 2n times the conventional art whereby only a single direction is scanned by a single beam.

In the case where a light emitting sources n equals 2, a pixel of the image area of the main scanning is divided into "1--L1" and "L1+1-L". "1-L1" is recorded by the forward scanning with the beam of the light emitting source #1 and "L1+1-L" is recorded by the backward scanning of one time before with the beam of the light emitting source #2 so that a first line is formed. "1-L1" is recorded by the backward scanning of one time before with the beam of the light emitting source #2 and "L1+1-L" is recorded by the forward scanning with the beam of the light emitting source #1 so that a second line is formed. Thus, the forward scanning and backward scanning are mutually implemented in a single line and data of the recording line shown by a dotted line are divided up as a part of the pixel to be recorded by the reciprocating scanning of the light emitting sources, so that the image is recorded in a shape of a triangle not having a bottom side.

Therefore, in a data structure recorded by the light emitting source #1, "1–L1" of the first line and "L1+1–L" of the second line are recorded in the forward scanning, and then "L–L1+1" of the third line and "L1–L" of the fourth line are recorded in the backward scanning, so that image recording is implemented.

The concavity and convexity in the shape of the triangle not having a bottom side are equal to or less than 1 line pitch and therefore it is not possible to identify this by human eye. In the case where a light emitting source n is 4, a pixel of the image area of the main scanning is divided into "1–L1", "L1+1–L2", "L2+1–L3", and "L3+1–L". "1–L1" is recorded by the forward scanning with the beam of the light emitting source #1, "L1+1–L2" is recorded by the backward scanning of one time before with the beam of the light emitting source #2, "L2+1–L3" is recorded by the forward scanning of one time before with the beam of the light emitting source #4, and "L3+1–L" is recorded by the backward scanning of one time before with the beam of the light emitting source #3, so that a first line is formed. "1–L1" is recorded by the backward scanning of one time before with the beam of the light emitting source #2, "L1+1–L2" is recorded by the forward scanning with the beam of the light emitting source #1, "L2+1–L3" is recorded by the backward scanning of one time before with the beam of the light emitting source #3, and "L3+1–L" is recorded by the forward scanning of one time before with the beam of the light emitting source #4, so that a second line is formed. Thus, the data of the recording line shown by a dotted line are divided up as a part of the pixel to be recorded by the reciprocating scanning of the light emitting sources.

Therefore, in a data structure recorded by the light emitting source #1, "1–L1" of the first line, "L1+1–L2" of the second line, "L2+1–L3" of the third line, and "L3+1–L" of the fourth line are recorded in the forward scanning, and then "L–L3+1" of the fifth line, "L3–L2+1" of the sixth line, "L2–L1+1" of the seventh line, and "L1–1" of the eighth line are recorded in the backward scanning, so that image recording is implemented.

Thus, the image data in one line are divided as corresponding to the number of the light emitting sources. Hence, even if the beam is scanned in zigzags, the light and shade of the whole of the image is made even, so that a high quality image forming without unevenness of the light and shade can be done.

The same effect can be obtained in a case where not the scanned surface but the scanning position is moved in the sub-scanning direction so that main scanning is implemented. In addition, the beam pitch from the light emitting source on the scanned surface is not limited to twice the line pitch corresponding to the recording density. For example, if the beam pitch is smaller than the line pitch, unevenness of the light and shade can be reduced while the efficiency of the image recording is degraded.

As described above, in the optical scanning units 500Y, 500M, 500C and 500Bk, the scanning lines between the optical scanning means are adjusted to be in parallel. Hence, the line is adjusted with reference to black line as a reference line so that inclinations of the lines (main scanning lines) in a direction perpendicular to a paper feeding direction are in parallel in respective colors. The scanning lines corresponding to the areas are in parallel, so that a color gap is not generated by the correction of the start-writing timing.

In this embodiment, although the resonance peak may differ among the vibrating mirrors 202, the sweep angles can be consistent with each other in a prescribed frequency band by varying the gain of the applied voltage. Consequently, the scanning operation can be implemented at the same driving frequency.

The spring constant K may change due to a change in the environmental temperature, and the resonant band may shift all together. When selecting the driving frequency again in response to such a change, a common driving frequency is given to all the vibrating mirror modules, and the registration of each scanning line can be consistent to the end of the scanning area.

Figure 23:
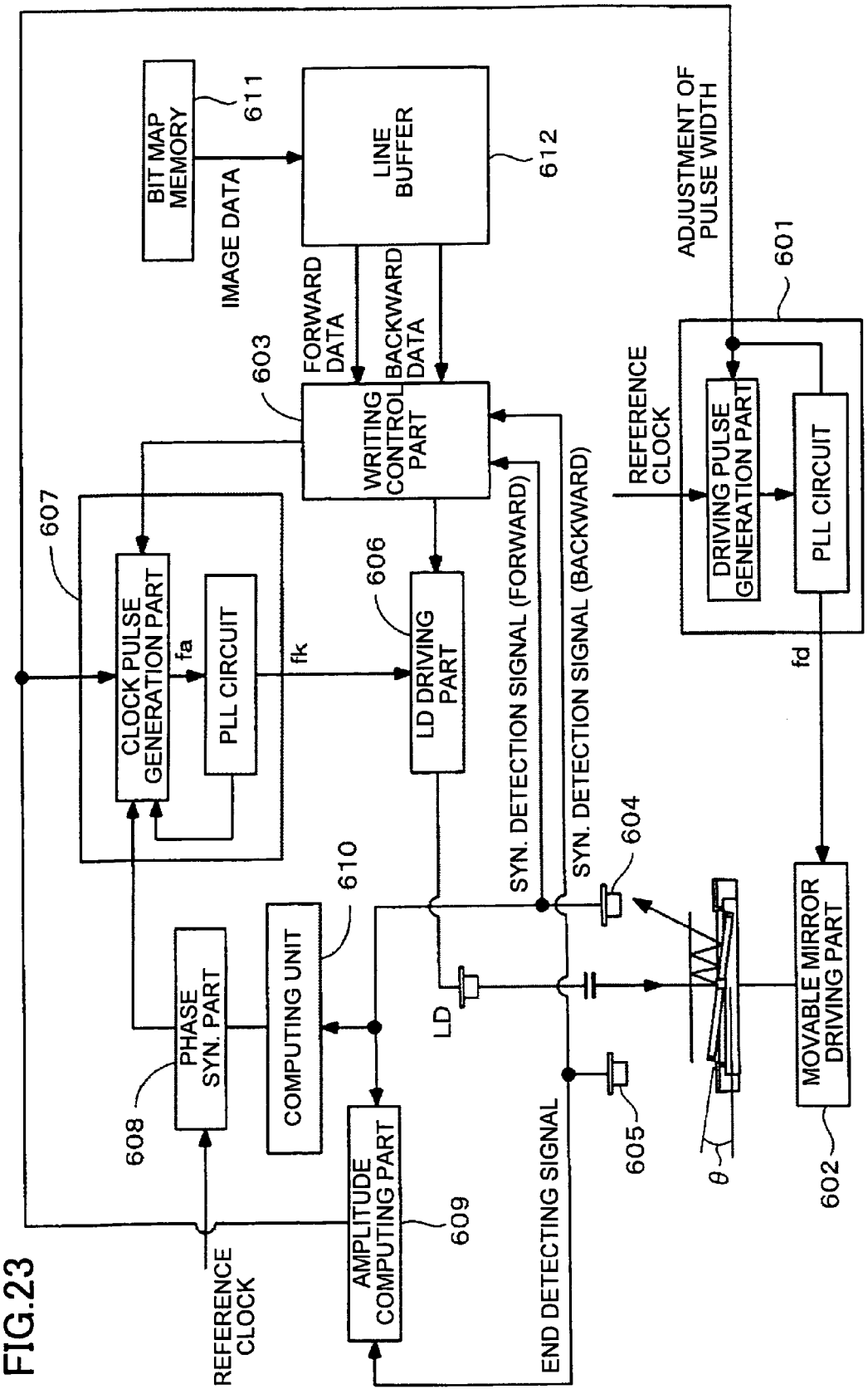
FIG. 23 is a control block diagram.

FIG. 23 is a block diagram showing an example of a control system for driving the semiconductor laser 101 and the vibrating mirror 202. The image data are stored in a bit map memory 611 for every vibrating mirror module 130, raster-developed for every light emitting sources, and store in a line buffer as line data.

The stored line data are read out for image recording by using a synchronization detection signal output from a synchronization detection sensor 604 in forward scanning or an end detection sensor 605 in backward scanning as a trigger so that image recording is implemented. At this time, input data are read by reversing the order of data in between the forward and backward scanning, that is, by switching a buffer output from the head and a buffer output from the end.

The driving pulse generating unit 601 divides the reference clock by a programmable divider, and generates a sequence of pulses such that a voltage pulse is applied at timing corresponding to the oscillation of the vibrating mirror 202. The PLL circuit of the pulse generating unit 601 gives a predetermined phase delay δ between the vibrating mirror modules 130. The phase adjusted pulses are supplied to the moving mirror driving unit 602, and a voltage is applied to the respective electrodes of the vibrating mirror 202.

The relative phase delay δ among the vibrating mirrors 220 is expressed using a pitch p of a scanning line.

$$\delta = (1/fd) \times [(\Delta y/p) - n]$$

where n is a natural number that satisfies (Δy/p)–n<1. Under this condition, the positional offset at the seam of the lines becomes an integral multiple. By correcting writing timing every other period of the vibrating mirror, that is, by writing data while shifting n line periods, the registration offset Δy in the slow scan direction can be cancelled. Consequently, high image quality can be achieved by preventing positional offset at the seams.

The synchronization detection sensor 604 and the end detection sensor 605 are provided on the print board 112. Their detection surfaces are arranged such that the length of the light path is the same as the optical path length to the photosensitive body drum surface.

Figure 24:
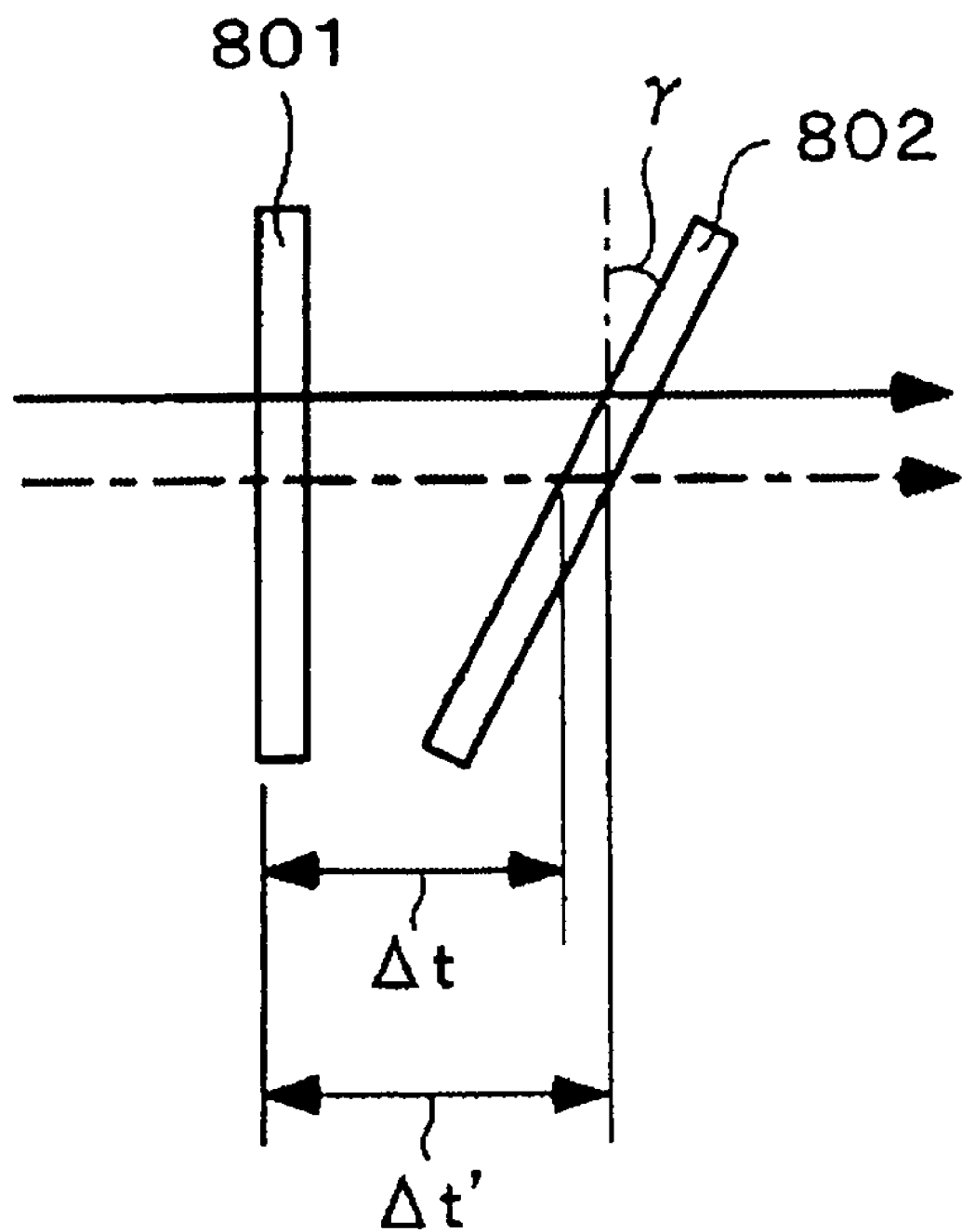
FIG. 24 is a view showing detection mechanisms of a synchronous detection sensor and an end detection sensor.

FIG. 24 illustrates the detecting part of the sensor, which includes a photodiode 801 arranged perpendicular to the main-scanning direction, and a photodiode 802 arranged so as not to be perpendicular to the main-scanning direction. When the beam passes the edge of the perpendicular photodiode 801, a synchronization detection signal or an end detection signal is generated. By measuring a time difference Δt between the photodiode 801 and the photodiode 802, the positional offset Δy in the sub-scanning direction, which is the major factor of the registration offset, can be detected as an estimation corresponding to the offset on the scanned plane (that is, on the photosensitive drum).

The offset Δy can be expressed using a tilt angle γ of the photodiode 802 and the scanning speed v of the light beam.

$$\Delta y = (v/\tan \gamma) \times \Delta t.$$

If Δt is constant, positional scan offset does not occur.

In this embodiment, time difference Δt is monitored at the computing unit 610 to detect the positional scan offset, and the detected time difference is corrected so as to be consistent with the Δt reference value by varying the phases among the vibrating mirror modules.

Basically, driving voltages are not applied to the vibrating mirror 202 other than during the image recording period and the preparation period.

At power-on time and activation time from the waiting state, the dividing ratio is successively varied by the programmable divider to change the driving frequency fd from the higher side for excitation of the mirror. The beam is detected by the synchronization detection sensor 604 and the end detection sensor 605 that is located near the sweep angle of −θ0. The time difference T between the synchronization detection signal and the end detection signal is measured by the amplitude computing part 609. The maximum sweep angle (amplitude θ0) of the vibrating mirror 202 can be detected based on the output of the amplitude detector.

If the scanning angle θd of the light beam is detected by the sensor, the ratio of θd to the amplitude θ0 is expressed as $$\theta d/\theta 0 = \sin 2\pi \times fd \times t, \ t = T/2$$

where fd is the driving frequency of the vibrating mirror 202, and t is the scan time from the center of the image.

The sweep angle is corrected by changing the gain of the applied pulse until the time difference T reaches the prescribed reference value T0.

This correction of the sweep angle is carried out constantly under certain environments, for example, between jobs. If the sweep angle is corrected during the recording operation of the image, the end portions of the image along the fast scan line fluctuate. Because of this, the sweep angle is kept constant during the recording operation.

The sweep angles of the respective vibrating mirrors 202 are made consistent with each other by selecting a common driving frequency and by setting a reference value of the gain.

The above-described corrections are carried out in each of the vibrating mirror modules 130 (in this example, three modules). When all the corrections are finished in the respective modules, the printing operation is allowed. A writing control part 603 functions as recording control means.

Figure 25:
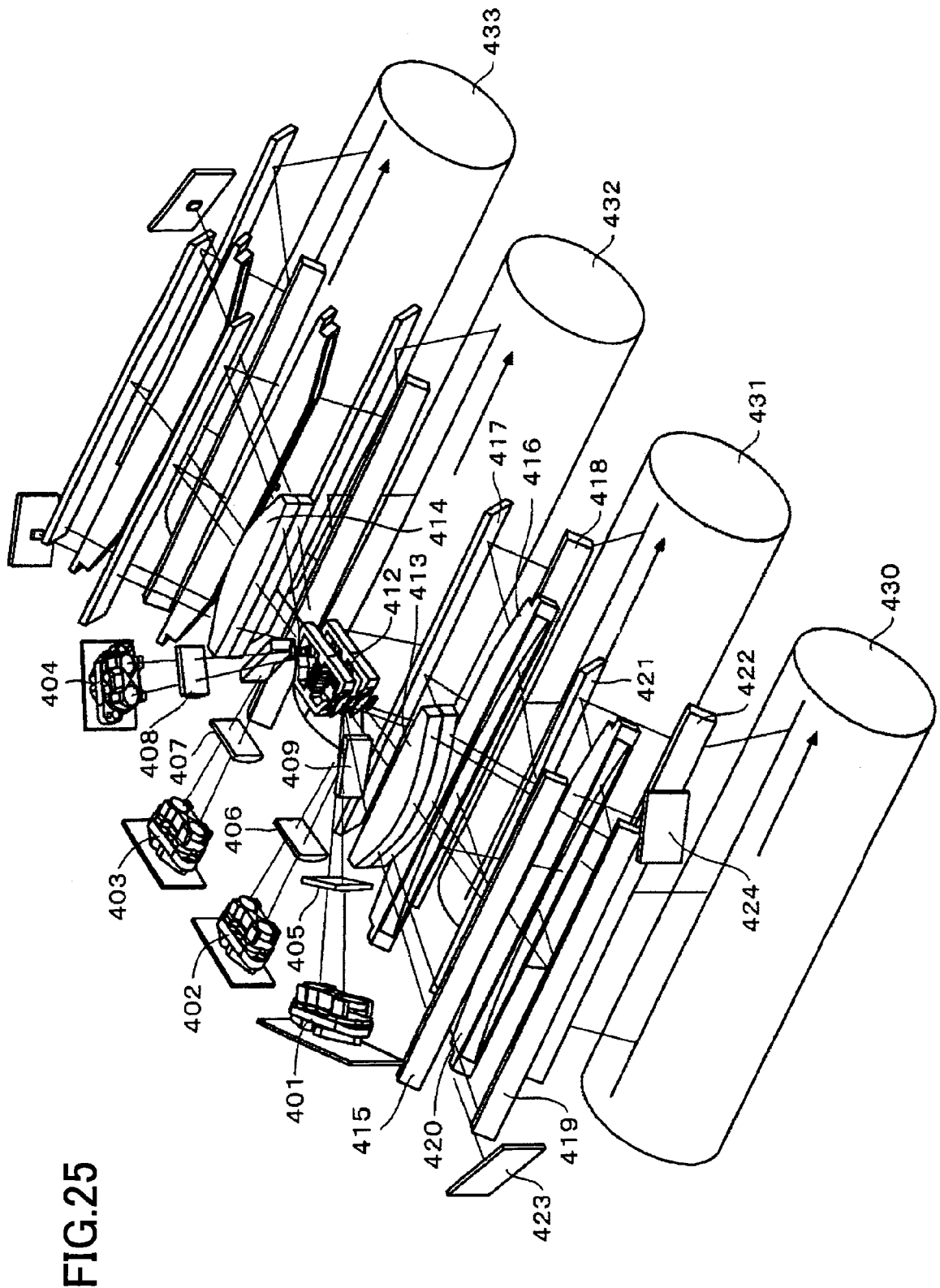
FIG. 25 is a perspective view of a main part of an optical scanning unit according to a second embodiment of the present invention.
Figure 26:
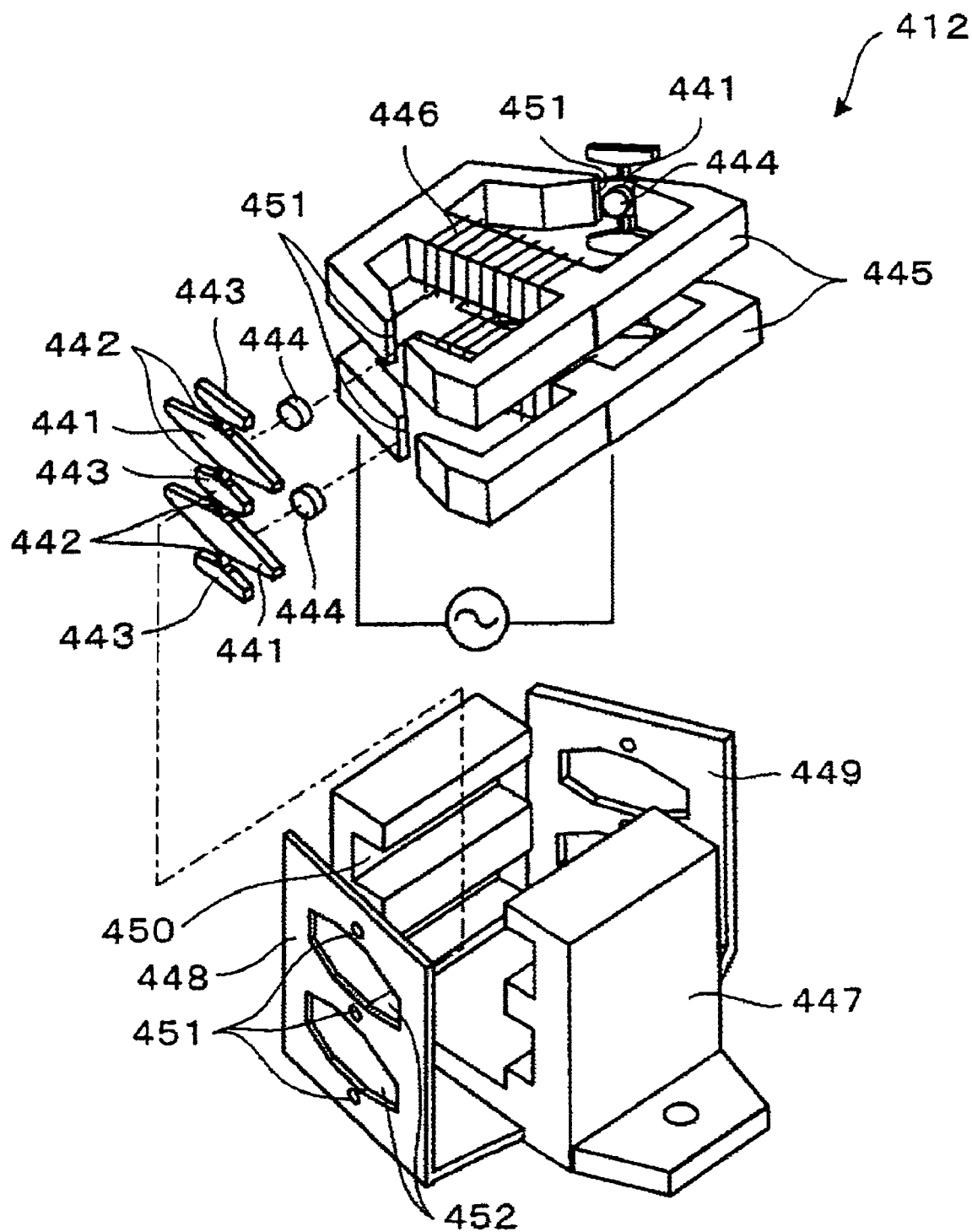
FIG. 26 is an exploded perspective view of a vibrating mirror module according to the second embodiment of the present invention.

Next, the second embodiment of the present invention is discussed with reference to FIG. 25 and FIG. 26. In FIG. 25 and FIG. 26, parts that are the same as the parts shown in the first embodiment are given the same reference numerals, and explanation thereof is omitted.

An example of a print head dividing the main scanning area and scanning is discussed in the first embodiment. In the second embodiment, an example of a polygon mirror whereby the main scanning area is scanned by a single vibration mirror is discussed.

In this embodiment, since a bigger vibration mirror is used and a sweep angle is secured, an electromagnetic driving method whereby a rotational torque corresponding to this is applied.

FIG. 25 shows an example of an optical scanning unit corresponding to color image forming. FIG. 26 shows details of a vibrating mirror module.

As shown in FIG. 26, the vibrating mirrors 441 are formed at two stages. Three anchor parts (fixing parts) 443 and torsion bars 442 connecting the anchor parts are formed in a body by etching a single Si substrate (80 μm) so as to take out the external part of the Si substrate. A pair of the vibrating mirrors 441 is provided so that reflection surfaces of the vibrating mirrors form a scanning angle of 60 degrees. The reflection surfaces are visible from the opening 452 formed in stand bending parts 448 and 449 of supporting member 447. The vibrating mirror 441 is supported in a state where the three anchor parts 443 are connected to the fixing point 451.

A core holding part 450 made of resin is provided in the center of the supporting member 447 so that fixing cores 445 are staked at two stages as corresponding to the reflection surface. The fixing core 445 is fixed into a recess part of the supporting member 447.

The vibrating mirror module 412 is arranged in the center of the optical scanning unit as shown in FIG. 25. The light beams emitted from the light source units 401 through 404 as light source parts and irradiated with a designated interval in the sub-scanning direction are simultaneously scanned in a directly-opposed direction by the corresponding vibrating mirrors 441. The light beams are irradiated onto the photosensitive drums 430 through 433 corresponding to yellow, cyan, magenta, and black so that image forming is implemented.

Two semiconductor lasers are installed in each of the light source units 401 through 404. The optical axis is set so that respective light beams cross in a main scanning direction in the vicinity of the reflection surface of the vibrating mirror 441. Under this structure, plural lines neighboring on the photosensitive drums 430 through 433 are simultaneously scanned.

Next, the paths of light beams traveling from the light source units 401 through 404 to the photosensitive drums 430 through 433 are discussed. The light beam from the light source unit 401 is deflected on a reflection surface of a lower step of the vibrating mirror 441 via the cylinder lens 405 and the irradiation mirror 409 so as to be irradiated on a lower step of fθ lens 413. As a result of this, an image formation in a spot state is made on the photosensitive drum 430 by a toroidal lens 420.

The light beam passing through the fθ lens 413 is irradiated on the toroidal lens 420 by a return mirror 419 so as to reach the photosensitive drum 430 via the return mirror 421 and 422. The fθ lens 413 is molded with resin in a body by stacking lens having the same configurations.

The light beam from the light source unit 402 is deflected on a reflection surface of an upper step of the vibrating mirror 441 via the cylinder lens 406 so as to be irradiated on an upper step of the fθ lens 413. The light beam is irradiated on the toroidal lens 420 by the return mirror 415 so as to be reflected by the return mirrors 417 and 418 and reach the photosensitive drum 416.

The light source units 403 and 404 are symmetrically arranged with respect to the vibrating mirror module 412. Travel of the light beams to the photosensitive drums 432 and 433 is the same as the travel to the photosensitive drum 431 and therefore the explanation thereof is omitted.

Cylindrical-shaped permanent magnets are respectively connected to the center of a rear side of the reflection surface of the vibrating mirror 441. The permanent magnets are positioned by the supporting member 447 so as to be arranged in the center of the gap 451 of the fixed core 445 formed in a C shape. Both ends sandwiching the gap 451 face each other in the main scanning direction with a designated gap.

In this embodiment, the fixing cores 445 are formed in a body so as to face the upper or lower step of the vibrating mirror 441 whereby the light beam is scanned in directly opposed directions. A coil 446 is wound in the center of the fixed core 445. Magnetic flux is generated between the gaps 451 by current flowing in the coil 446 so that the rotational torque causes the torsion bar 442 to work as a rotational axis. As a result of this, the attitude of the permanent magnetic 444 fixed to the vibrating mirror 441 is changed, the torsion bar 442 is twisted, and the vibrating mirror 441 is inclined.

Therefore, the direction of the magnetic flux is changed as time passes if alternating electric current flows through the coil 446, so that the vibrating mirror 441 vibrates.

As well as the first embodiment, in this embodiment, if the voltage is applied to the coil 446 at the frequency adjusted to a mechanical resonance frequency peculiar to the vibrating mirror 441, the vibrating mirror 441 is excited so that a great sweep angle can be obtained.

The sweep angle of this embodiment is 25 degrees. A maximum scanning angle, 50 degrees, is obtained without using multiple reflection in this embodiment. That is, 25 degrees of the 50 degrees is an image recording area.

In FIG. 26, numerical references 423 and 424 represent substrates where the synchronization detection sensor and the end detection sensor are mounted. These substrates detect the scanning beam to detect change of the sweep angle and adjust the applied gain to secure the sweep angle.

The present invention is not limited to the above-discussed embodiments, but variations and modifications may be made without departing from the scope of the present invention.

This patent application is based on Japanese Priority Patent Applications No. 2004-231111 filed on Aug. 6, 2004, and No. 2004-363438 filed on Dec. 15, 2004, the entire contents of which are hereby incorporated by reference.

What is claimed is:

1. An optical scanning unit, comprising:
   a light source having a plurality of light emitting sources;
   a plurality of vibration mirror parts configured to reciprocatingly scan light beams emitted from the light emitting sources where a torsion bar is a rotational axis; and
   a recording control part configured to output image information for modulating the light emitting sources corresponding to a scan operation of the vibrating mirror parts,
   wherein recording data is divided for each light emitting source, and pixels in a single line to be recorded are divided into a pixel recorded by forward scanning and a pixel recorded by backward scanning, and
   a sub-scanning pitch d on a scanned surface scanned by the light emitting sources and a driving frequency f of the vibrating mirror parts are defined by the following formulas, namely $d=2p$ $f=v/2n \times p$, and the number of the light emitting sources is n, a moving speed of a scanned surface against a scanning position or a moving speed of the scanning position against the scanned surface is v, and a line gap to be recorded is p.

2. The optical scanning unit as claimed in claim 1,
   wherein the driving frequency is set to a frequency band that is in the vicinity of but separated from a resonance point of the vibrating mirror parts.

3. The optical scanning unit as claimed in claim 1,
   wherein the recording control part is configured to implement image recording by mixing image information corresponding to one line and forward and backward scans of the vibrating mirror parts.

4. The optical scanning unit as claimed in claim 3,
   wherein the one line is divided into n areas, and
   the recording control part is configured to implement the image information so that main scanning directions of neighboring areas are different.

5. The optical scanning unit as claimed in claim 1,
   wherein a sweep angle for image recording is equal to or less than 50% of a maximum sweep angle of the vibrating mirror parts.

6. The optical scanning unit as claimed in claim 1, further comprising:
   a sweep angle detection part configured to detect a change of a maximum sweep angle (amplitude) of the vibrating mirror parts;
   wherein the driving frequency of the vibrating mirror parts are controlled to be made constant and the maximum sweep angle is controlled to be made constant based on the detection result, at least during image recording.

7. The optical scanning unit as claimed in claim 6,
   wherein beam detection parts configured to detect the light beams scanned by the vibrating mirror parts are provided on at least two positions on a scanning line, and
   the maximum sweep angle (amplitude) is calculated based on detected scanning time.

* * * * *